US011161560B2

(12) United States Patent
Anderson et al.

(10) Patent No.: US 11,161,560 B2
(45) Date of Patent: Nov. 2, 2021

(54) MOTOR VEHICLE MODULAR CONSTRUCTION

(71) Applicant: ARBOC Specialty Vehicles, LLC, Middlebury, IN (US)

(72) Inventors: Joshua J. Anderson, Charlotte, NC (US); Thomas A. Kuhl, Davenport, FL (US); Donald W. Roberts, Franklin, NC (US)

(73) Assignee: Arboc Specialty Vehicles, LLC, Middlebury, IN (US)

( * ) Notice: Subject to any disclaimer, the term of this patent is extended or adjusted under 35 U.S.C. 154(b) by 207 days.

(21) Appl. No.: 16/271,017

(22) Filed: Feb. 8, 2019

(65) Prior Publication Data

US 2020/0114995 A1 Apr. 16, 2020

Related U.S. Application Data

(60) Provisional application No. 62/744,564, filed on Oct. 11, 2018.

(51) Int. Cl.
*B60J 7/00* (2006.01)
*B62D 63/02* (2006.01)
*B62D 63/04* (2006.01)
*B60K 5/10* (2006.01)

(52) U.S. Cl.
CPC .............. *B62D 63/025* (2013.01); *B60K 5/10* (2013.01); *B62D 63/04* (2013.01)

(58) Field of Classification Search
CPC .... B62D 63/025; B62D 63/04; B62D 31/025; B62D 23/005; B60K 5/10; B60Y 2200/143

USPC ................................ 180/89.11, 312; 280/312
See application file for complete search history.

(56) References Cited

U.S. PATENT DOCUMENTS

| | | | | |
|---|---|---|---|---|
| 2,425,948 A * | 8/1947 | Lucien | ................. | B62D 31/025 180/11 |
| 5,401,056 A * | 3/1995 | Eastman | .................. | B60G 3/20 280/785 |
| 5,577,793 A * | 11/1996 | Kobasic | ................. | B60J 5/0498 296/146.12 |
| 6,237,989 B1 * | 5/2001 | Ammerlaan | ......... | B62D 29/046 105/397 |
| 6,276,477 B1 * | 8/2001 | Ida | ......................... | B62D 21/07 180/89.1 |
| 6,923,282 B2 * | 8/2005 | Chernoff | .................. | B60K 1/00 180/65.22 |
| 7,097,232 B2 * | 8/2006 | Beaudry | ................ | B62D 21/18 180/311 |

(Continued)

*Primary Examiner* — Toan C To
(74) *Attorney, Agent, or Firm* — Perry + Currier Inc.

(57) ABSTRACT

A motor vehicle and construction method for a motor vehicle, such as a bus, wherein fabricated subassemblies or modules are joined using mechanical fasteners to form an integrated, load carrying structure. The fabricated subassemblies are configured to allow substitution of subassemblies with alternative configurations in order to produce a number of unique vehicle configurations each sharing a common architecture. Modular construction techniques allow for simplification of construction processes, reduction of welding processes, and the application of physically smaller subassemblies. Interchange and substitution of subassemblies with shared attributes may also facilitate production of vehicles having different characteristics.

17 Claims, 28 Drawing Sheets

(56) References Cited

U.S. PATENT DOCUMENTS

| | | |
|---|---|---|
| 7,334,659 B2 | 2/2008 | Racz et al. |
| 7,862,101 B2 * | 1/2011 | Lusk .................. B62D 31/02 296/178 |
| 8,109,551 B2 * | 2/2012 | Kerr .................. B62D 31/02 296/25 |

* cited by examiner

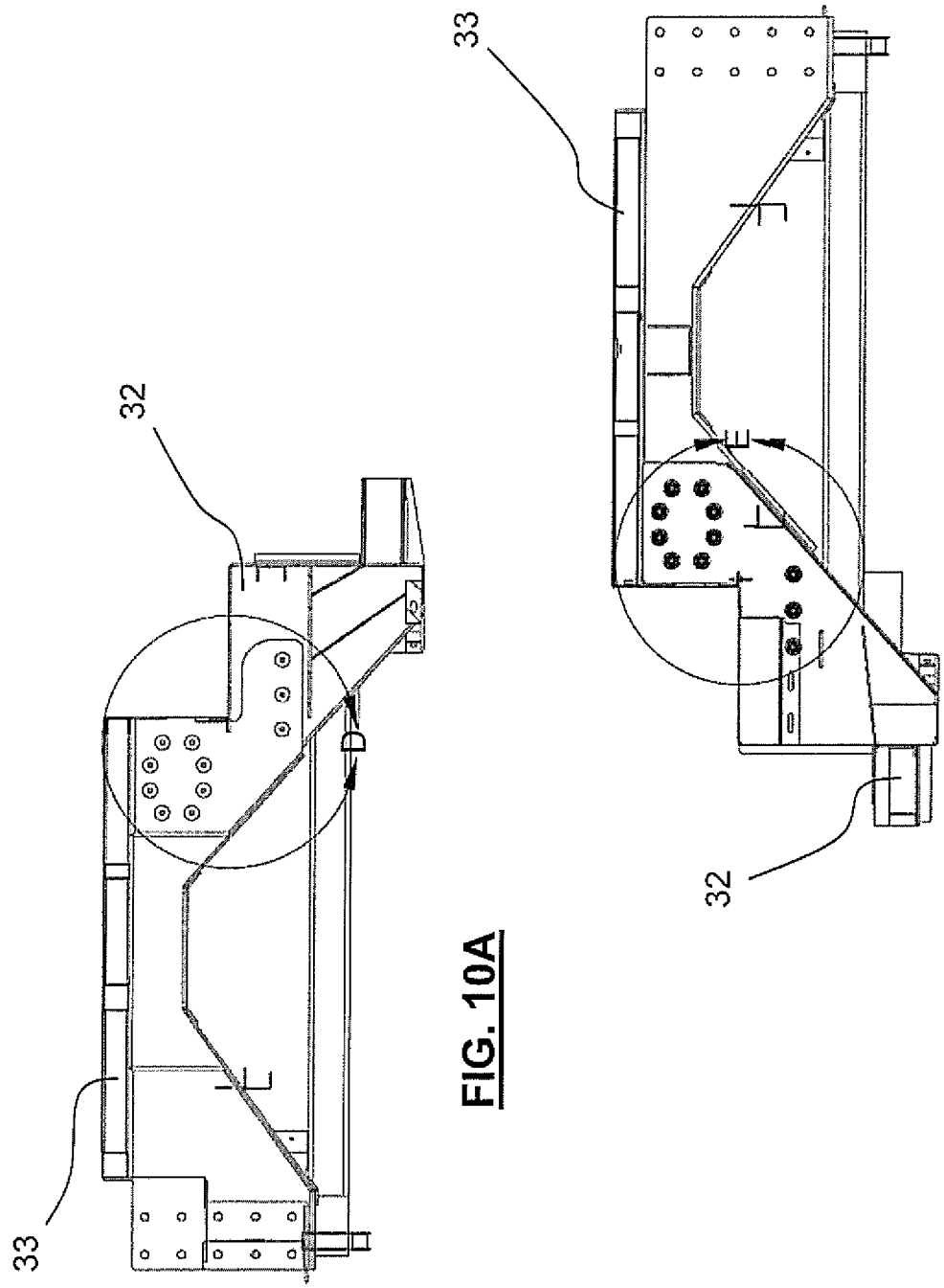

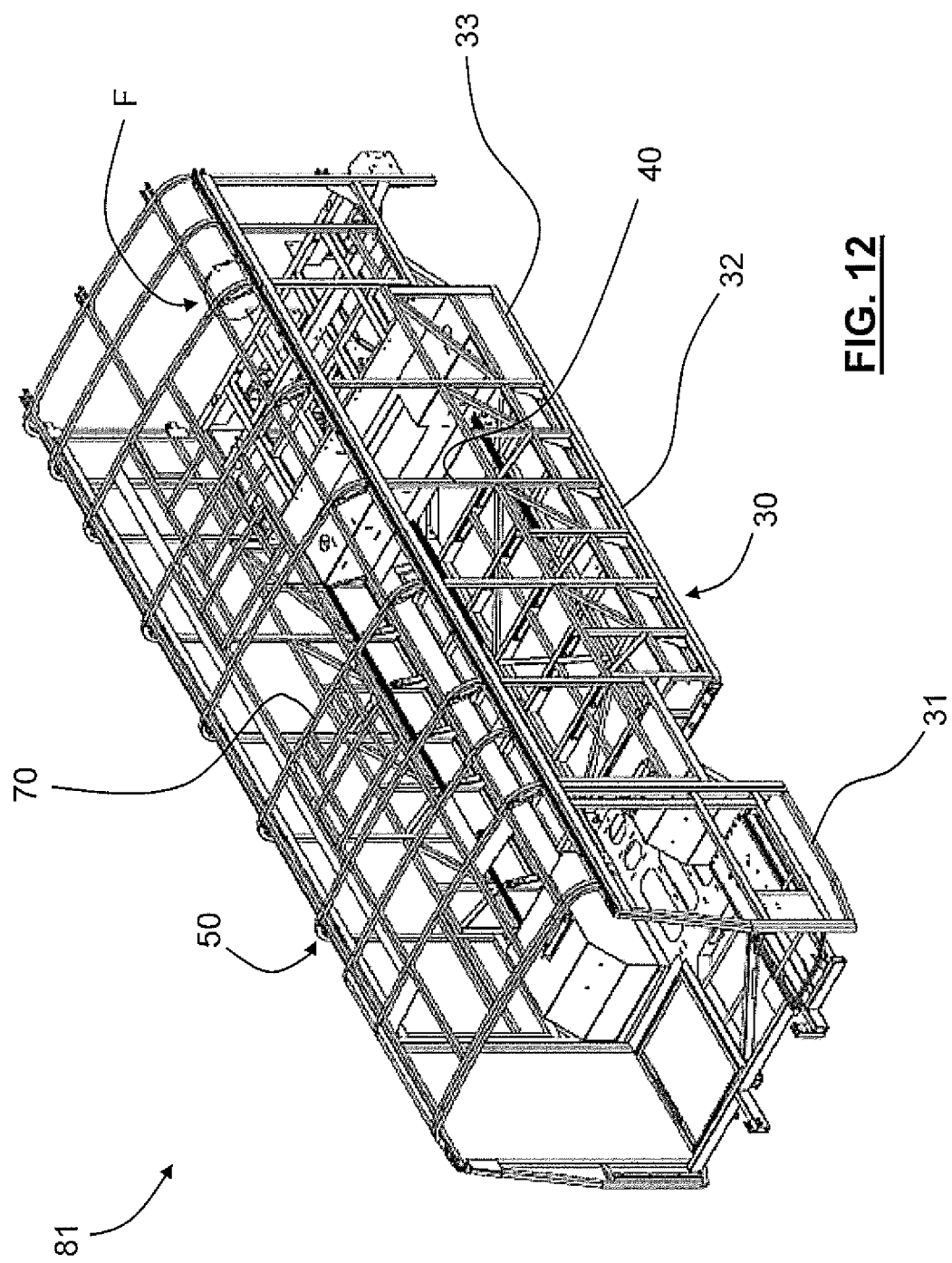

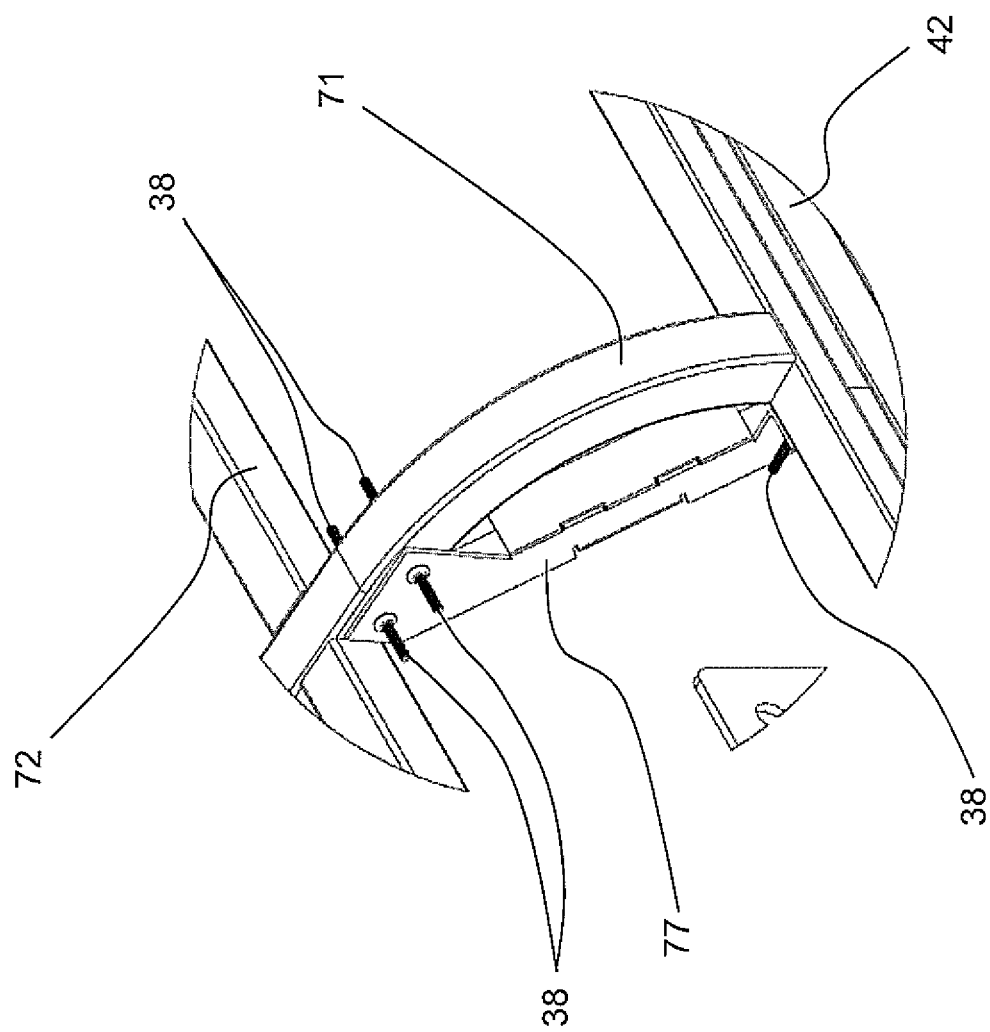

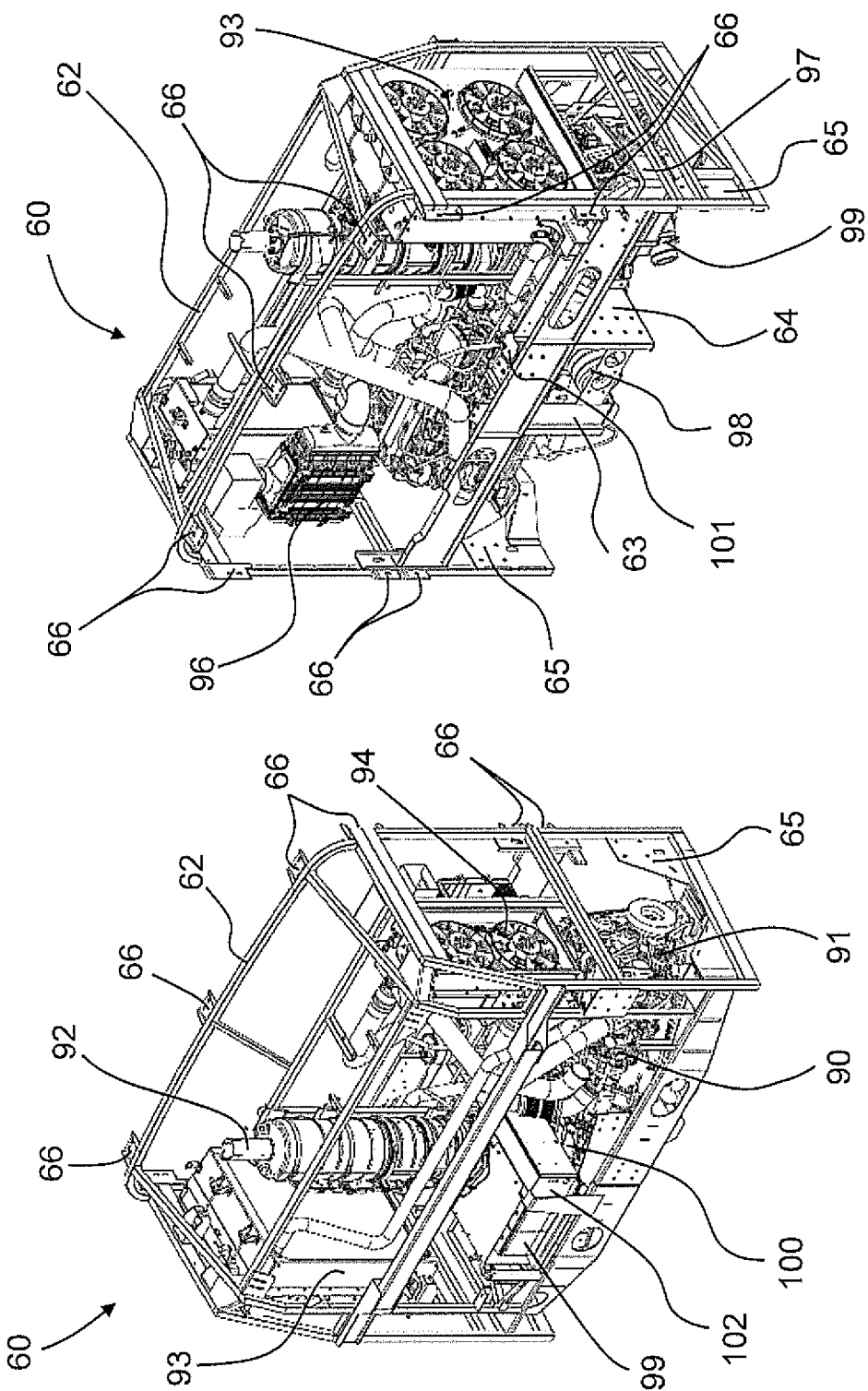

MOTOR VEHICLE MODULAR CONSTRUCTION

CROSS-REFERENCE TO RELATED APPLICATIONS

This application claims all right and benefit of U.S. provisional application Ser. No. 62/744,564, filed Oct. 11, 2018, the entire contents of which are herein incorporated by reference.

TECHNICAL FIELD

Embodiments of the invention(s) described herein relate generally to an arrangement for a vehicle structure, such as that of a bus, and to associated methods for the design and assembly of vehicle structures.

BACKGROUND

Passenger buses and other heavy duty motor vehicles are commonly constructed using a base chassis that includes two or more beam elements supported longitudinally between two or more wheeled axles. Cross bracing is also commonly applied to the chassis to hold the beam elements a fixed distance apart and, in addition, to provide a support structure for other components of the vehicle, such as the engine, transmission, and other large components. Such a design typically, but not always, may involve the power train elements being positioned forward of the front most axle or rearward of the rear most axle, and a driven shaft to provide motive power to at least one driven axle. Other elements that form part of or which interact with the chassis may also be attached to the beam elements. The support beams in this type of configuration are sometimes referred to as "rails" or a "rail chassis".

Most rail chassis are designed to be structurally independent of other support elements within the vehicle and to be freestanding without a vehicle body or other structures above or below them. At least partly for this reason, many rail chassis are manufactured separately from other components of the vehicle and are then sold to subsequent assemblers who install vehicle bodies and other elements onto the base chassis. Examples of such body elements may include an operator cab and separate load carrying box, a unitized parcel delivery truck body, a bus body, and the like. Body elements are also commonly separated from the rail chassis using vibration isolators or other damping elements in order to limit transmission of vibration from the chassis to the body elements.

An alternative approach to the use of rail chassis is to construct a unitized cage body that is directly mounted to and contains the vehicle powertrain elements and other components, while at the same time providing structural rigidity for the operation of the vehicle. This type of design, sometimes referred to as a "monocoque" structure, shares and distributes structural loads throughout the chassis and body elements by joining them together into a single cage that typically will be a welded assembly of parts. The use of monocoque structures has several advantages for bus design and operation. These may include providing a lower, flat entry door and passenger floor, increased interior headroom, improved chassis dynamics including ride and handling, a decreased overall vehicle mass, and other advantages.

SUMMARY

In at least one broad aspect, there is provided a motor vehicle that includes a base chassis, a vehicle body, and a power train module. The base chassis is supported on at least two axles and is formed out of a plurality of fabricated base chassis subassemblies joined to one another by one or more mechanically fastened interfaces. The vehicle body is mechanically fastened to the base chassis forming a vehicle module with a unitized frame that provides structural rigidity for the motor vehicle. The power train module includes a power train assembly that provides a motive power source for the vehicle and is independently fastenable to the unitized frame of the vehicle module.

In some embodiments, optionally, the base chassis includes at least three discrete base chassis subassemblies joined together.

In some embodiments, optionally, the at least three discrete base chassis subassemblies include a front subassembly that has a mounting for a free axle, a rear subassembly that has a mounting for a driven axle, and a middle subassembly supported between and coupling together the front and rear subassemblies.

In some embodiments, optionally, the vehicle body includes a plurality of fabricated vehicle body subassemblies joined to one another by one or more mechanically fastened interfaces.

In some embodiments, optionally, the plurality of fabricated vehicle body subassemblies include a plurality of sidewall subassemblies, and a roof subassembly supported on the plurality of sidewall subassemblies.

In some embodiments, optionally, the vehicle module and the power train module are releasably fastened together so as to be separable therefrom following assembly.

In some embodiments, optionally, the plurality of fabricated base chassis subassemblies are releasably fastened together by non-permanent joints.

In some embodiments, optionally, the power train module forms the complete structure of the motor vehicle aft of the vehicle body.

In at least one other broad aspect, there is provided a method of assembling a motor vehicle. The method involves assembling a base chassis to be supported on at least two axles by joining together a plurality of fabricated base chassis subassemblies by one or more mechanically fastened interfaces, mechanically fastening a vehicle body to the base chassis to form a vehicle module with a unitized frame that provides structural rigidity for the motor vehicle, and mechanically fastening a power train module to the unitized frame of the vehicle module. The power module includes a power train assembly that provides a motive power source for the vehicle and is assembled independently of the vehicle module prior to fastening thereto.

In some embodiments, optionally, assembling the base chassis involves joining together at least three discrete base chassis subassemblies.

In some embodiments, optionally, the at least three discrete base chassis subassemblies includes a front subassembly that has a mounting for a free axle, a rear subassembly that has a mounting for a driven axle, and a middle subassembly supported between and coupling together the front and rear subassemblies.

In some embodiments, optionally, assembling the vehicle body involves joining together a plurality of fabricated vehicle body subassemblies by one or more mechanically fastened interfaces.

In some embodiments, optionally, the plurality of fabricated vehicle body subassemblies includes a plurality of sidewall subassemblies, and a roof subassembly supported on the plurality of sidewall subassemblies.

In some embodiments, optionally, the method involves selecting, for each of the plurality of fabricated base chassis subassemblies, a type and configuration of the fabricated base chassis subassembly to be included in the base chassis from a plurality of different types and configurations of base chassis subassemblies.

In some embodiments, optionally, the method involves assembling the vehicle module and the power train module in different locations prior to fastening together.

In some embodiments, optionally, the method involves detaching the power train module from the vehicle module subsequent to being fastened together.

In some embodiments, optionally, the method involves selecting a type and configuration of the power train module to be fastened to the vehicle module from a plurality of different types and configurations of power train modules.

In some embodiments, optionally, the method involves selecting a type and configuration of a fuel storage element to be installed on the motor vehicle based on the selected type and configuration of the power train module.

In some embodiments, optionally, the plurality of fabricated base chassis subassemblies are releasably fastened together by non-permanent joints.

In some embodiments, optionally, the power train module forms the complete structure of the motor vehicle aft of the vehicle body.

In at least one other broad aspect, there is provided a power train module of a motor vehicle having a unitized vehicle body. The power train module includes an internal combustion engine that generates motive power for the vehicle and a fabricated support assembly that supports and houses the internal combustion engine. The fabricated support assembly comprises a mechanical interface for attachment of the power train module to the unitized vehicle body.

In some embodiments, optionally, the fabricated support assembly includes a detachable substructure.

In some embodiments, optionally, the detachable substructure includes an engine mount to which the internal combustion engine is attachable.

In some embodiments, optionally, the mechanical interface includes at least one mounting plate supported on a crossbeam in a lower central area of the fabricated support assembly, and a plurality of mounting flanges arrayed around a perimeter frame of the fabricated support assembly.

In some embodiments, optionally, the power train module forms the complete structure of the motor vehicle aft of the unitized vehicle body.

Further details of these and other aspects of the described embodiments will be apparent from the detailed description to follow below.

BRIEF DESCRIPTION OF THE DRAWINGS

In the following description, reference is made to the accompanying drawings, in which:

FIG. 10A is a side view of the vehicle chassis shown in FIG. 7 along cross section B-B, illustrating one side of the bolted connection;

FIG. 10B is a side view of the vehicle chassis shown in FIG. 7 along cross section C-C, illustrating the other side of a bolted connection;

FIG. 12 is an orthographic view of a base portion of the fabricated vehicle assembly of FIG. 3A, showing a joint between the roof and wall elements;

FIGS. 13A and 13B are close-up views of a mechanically fastened joint for the roof to sidewall joints located in the base portion of the vehicle assembly shown in FIG. 12;

FIGS. 18A and 18B are rear and front orthographic views of a power train module;

For clarity and ease of description, like reference numerals will be used in the drawings to denote like parts of the described embodiments.

DETAILED DESCRIPTION

Figure 1:
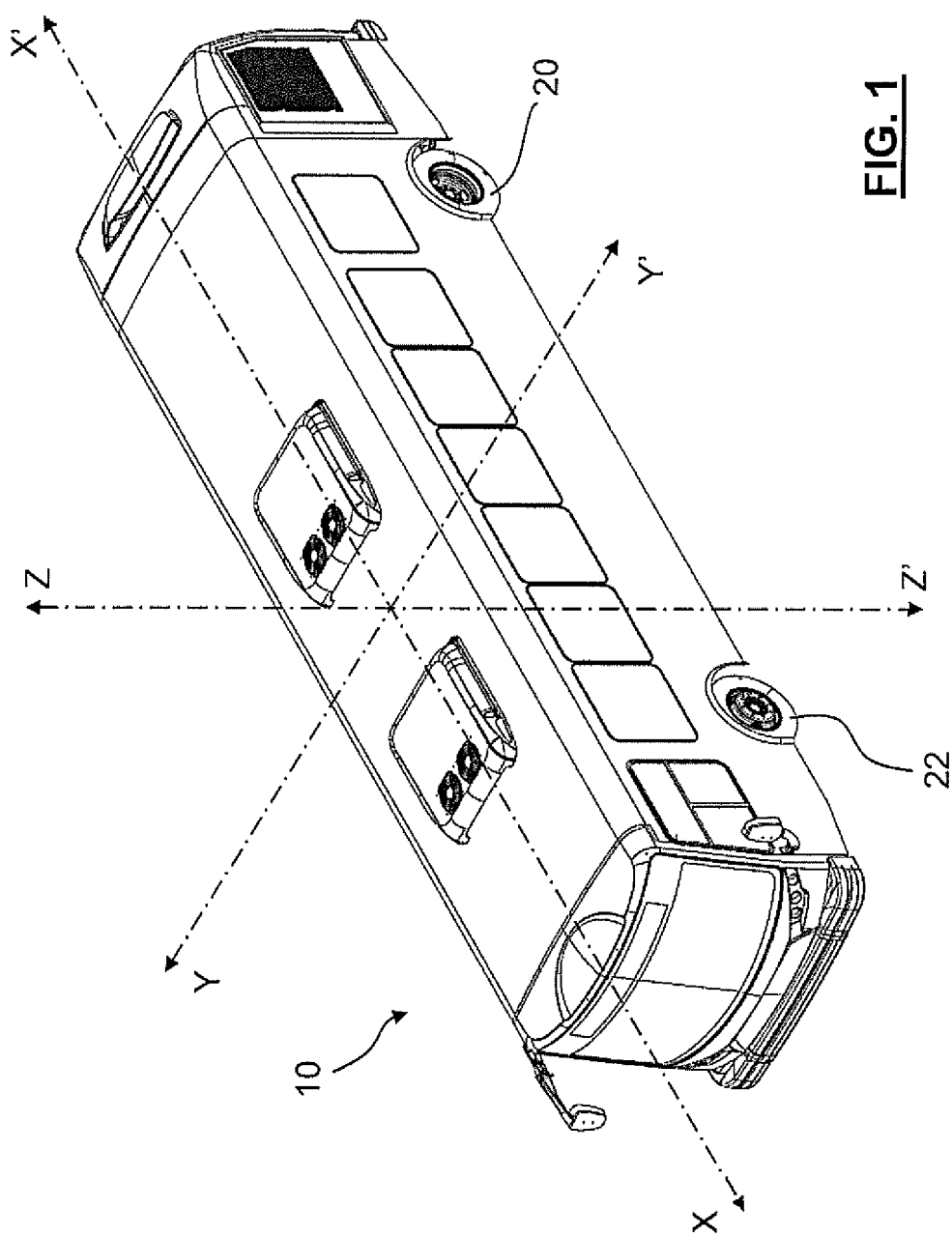
FIG. 1 is an orthographic view of a vehicle embodying features of the invention(s) described herein.

Rail chassis and monocoque vehicle design each have limitations. For example, rail chassis configurations in which body elements are structurally isolated from the vehicle chassis tend to restrict the degree to which body elements can provide structural rigidity for the vehicle. While monocoque structures to some extent provide improved performance in this respect, by comparison they tend to increase complexity of the overall design and the relative precision required of the fabricated elements. Monocoque structures also require relatively specialized handling and manufacture due to the physical size and weight of the completed cage and the numerous operations required for fabrication.

Embodiments of the invention(s) described herein provide a hybrid approach to vehicle construction that incorporates aspects of both the rail chassis and monocoque configurations. According to this approach, which may be referred to as a "semi-monocoque" for convenience, a base chassis may incorporate the wheeled axles and power train elements, but is not structurally independent from other components in the vehicle. For example, a vehicle body is attached directly to a base chassis, in some cases with mechanical fasteners, and substantially contributes to the overall structural rigidity of the vehicle. Such approach may provide many of the same benefits of a full monocoque design, while at the same time reducing some of the disadvantages.

Accordingly, embodiments of the invention(s) herein include a structure of a motor vehicle, such as a bus, employing a semi-monocoque construction technique and assembled of discrete and interconnecting subassemblies joined together with mechanical fastening. The motor vehicle structure in some embodiments can include a plurality of subassemblies encompassing wheeled axles and associated components and an intermediate structure that joins together the axle subassemblies. In addition, there may be provided a power train module that incorporates a motive propulsion unit, such as an engine and transmission. Side wall and roof subassemblies may be used to complete the vehicle cabin structure. Other subassemblies may optionally be included in the vehicle structure as well depending on design objectives and/or application.

Connections between the various vehicle subassemblies of the base chassis may be provided in the form of bolted interconnects as opposed to welded joints or other permanent connections. The side wall and roof subassemblies can be joined to the base chassis elements and to each other with structural riveted joints as opposed to welding or bolting. Optionally, in some cases, individual triangulating gusset brackets can also be used to reinforce any roof or wall subassemblies employing structural rivet fasteners.

Embodiments of the invention(s) herein further provide a removable power train modular assembly contained in an independent structural framework. Such a structural framework can allow for assembly of the power train and supporting components and subsystems into the power train module separate and apart from the vehicle structure itself. For example, cooling systems, electrical systems and storage batteries, exhaust aftertreatment systems, and other supporting subsystems can each be assembled into the separate power train module. The power train module may be joined to the primary vehicle module at different stages in the overall vehicle assembly process and, additionally, may be removed as a complete assembly both during the construction process or later on after the vehicle is completed and has been placed into operational service. The power train module can in some embodiments further include removable structural elements and sections that allow for partial disassembly of the power train module while installed on the vehicle.

The described embodiments differ from other designs in many ways. For example, use of modular subassemblies joined using mechanical fasteners with non-permanent interface joints may facilitate substitution of one element for an alternative having different features. The construction of small, or at least smaller, fabricated subassemblies facilitates material handling in a manufacturing environment up to the point where the complete vehicle structure is assembled. Smaller assemblies also provide for easier surface preparation and finishing in more commonly available facilities, such as for painting, electroplating, or laminating of finish surfaces.

In terms of interconnections within structural elements of motor vehicles, the described embodiments also allow for the use of mechanical fasteners that provide a repeatable and consistent transmission of loads and minimize welding processes in the assembly of the vehicle. Use of joining brackets and gussets in particular between different subassemblies may incorporate triangular structures that provide both a robust structural joint while allowing these subassemblies to be manufactured generally flat or with a single profile.

Further, the power train module of the vehicle can be assembled separately from the base vehicle module and thereafter mated to the vehicle module at different points or stages along the assembly line. Power train module assembly is in this way independent of the base vehicle assembly. Additionally, a base vehicle module and power train module can be joined together using a fastening method that allows for installation or removal of power train components from the base vehicle module at any point as a self-contained unit. Assembly of the power train module apart from the base vehicle module also allows access to different components retained within from multiple sides for mounting or attachment, compared to the relatively limited access that is usually available when installing components directly into the base vehicle. Use of a separable base vehicle module and power train module facilitates the installation and substitution of various fuel storage elements conveniently without requiring modification of the base vehicle.

Referring now to FIG. 1, there is shown an orthographic view of a vehicle 10 depicted with a driven rear axle 20 supporting driven wheels and a steering axle 22 supporting steered wheels. As shown, axis line X-X' is disposed in a longitudinal direction of vehicle 10 with a forward vehicle direction X and a reverse vehicle direction X'. A transverse axis Y-Y' of vehicle 10 is also shown in FIG. 1 with right side vehicle direction Y and a corresponding left side vehicle direction Y'. Likewise a vertical axis Z-Z' of vehicle 10 can indicate an upwards vehicle direction Z as well as a downwards vehicle direction Z'. Together these axes define a corresponding number of reference planes that may be used for convenience to describe features of the invention(s) herein. These may include a horizontal reference plane XY defined by longitudinal axis X-X' and transverse axis Y-Y', a vertical reference plane XZ defined by longitudinal axis X-X' and vertical axis Z-Z' form, and a vertical reference plane YZ defined by transverse axis Y-Y' and vertical axis Z-Z'.

Although not specifically indicated in FIG. 1, vehicle 10 may further comprise additional structural components that are typical of transport vehicles such as chassis, frames, support members, side, top, and bottom walls, and the like. Additional details of these and other structural components of vehicle 10 and their interconnections are provided below. The depiction of vehicle 10 in FIG. 1 shows a generally elongated structure. As will be appreciated, however, additional shapes and dimensionalities of vehicle 10 may be possible too.

Figure 2:
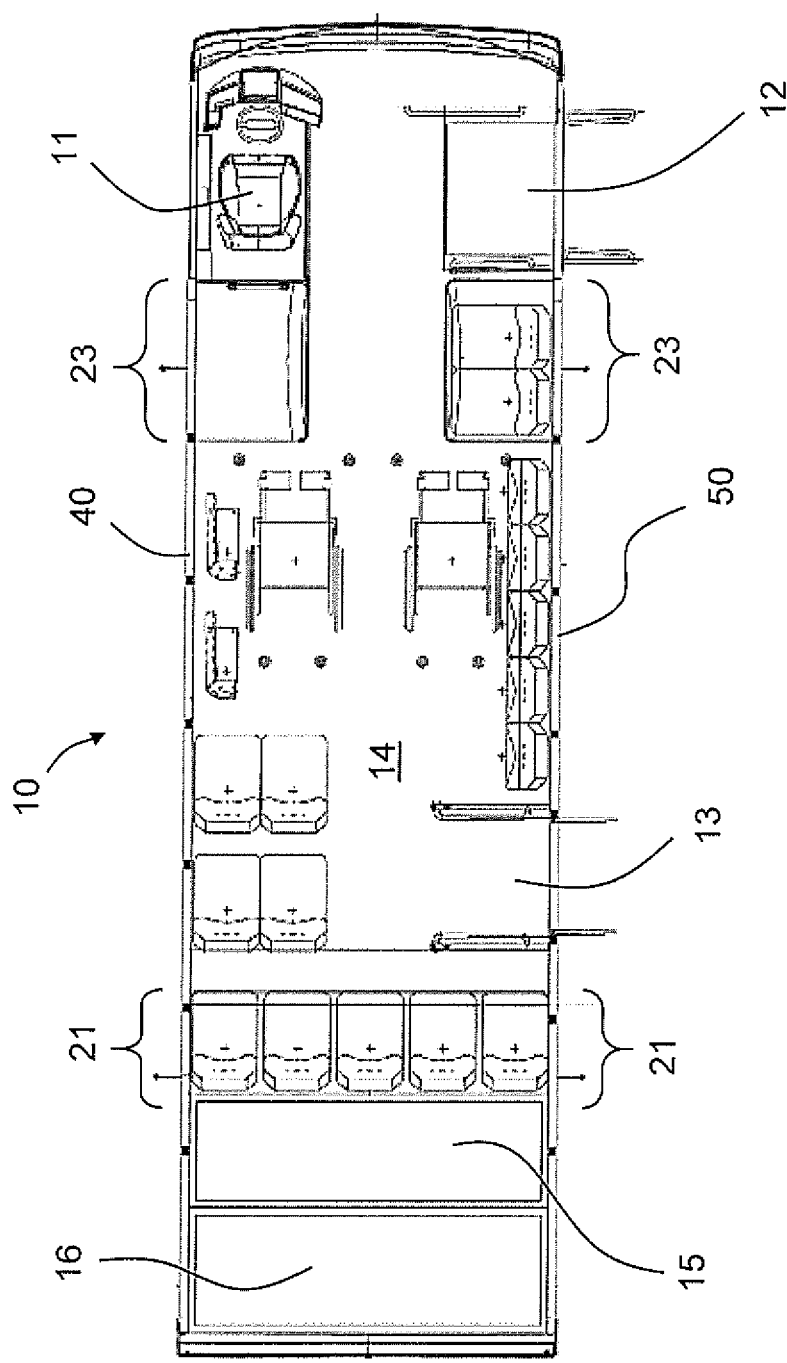
FIG. 2 is a top plan view of the interior cabin of a vehicle.

Referring now to FIG. 2, there is shown a plan view of vehicle 10 from a perspective that is orthogonal to the plane XY, i.e., a top down view in which reference plane XY is parallel to the page. As shown, vehicle 10 be configured as a low-entry, low floor bus that includes an operator area 11 and at least an entry/egress area 12 located proximate to operator area 11 near the front of vehicle 10. In some cases, optionally, there may also be a second entry/egress area 13 located further back toward the rear of vehicle 10. In some embodiments, the locations of entry/egress area 12 and/or second entry/egress area 13 may be varied.

Vehicle 10 may include a passenger area 14 provided with seating and/or other accommodations for passengers to rest while being transported in vehicle 10. The size and shape of passenger area 14 can be varied, but may generally encompass the area between a rear axle zone 21 and a front axle zone 23 in various embodiments. In addition, vehicle 10 may also be provided with a fuel storage area 15 and a power train compartment 16 located aft of rear axle zone 21 at the rear end of vehicle 10. In some case, the size of passenger area 14 may depend on the size of fuel storage area 15 and power train compartment 16. Passenger area 14 may also be defined laterally by a left side wall 40, a right side wall 50, and a vehicle roof.

Figure 3A:
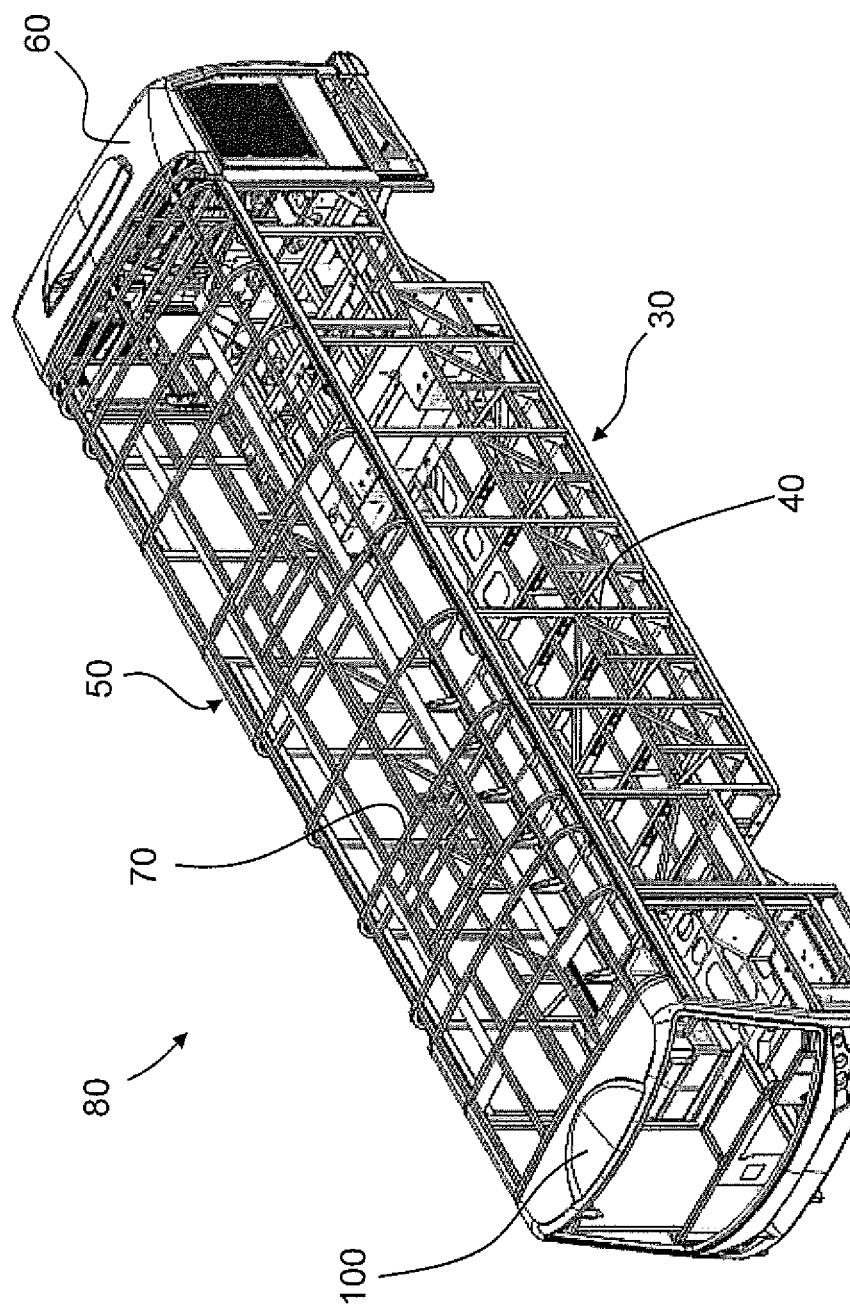
FIG. 3A is an orthographic view of a fabricated vehicle assembly.
Figure 3B:
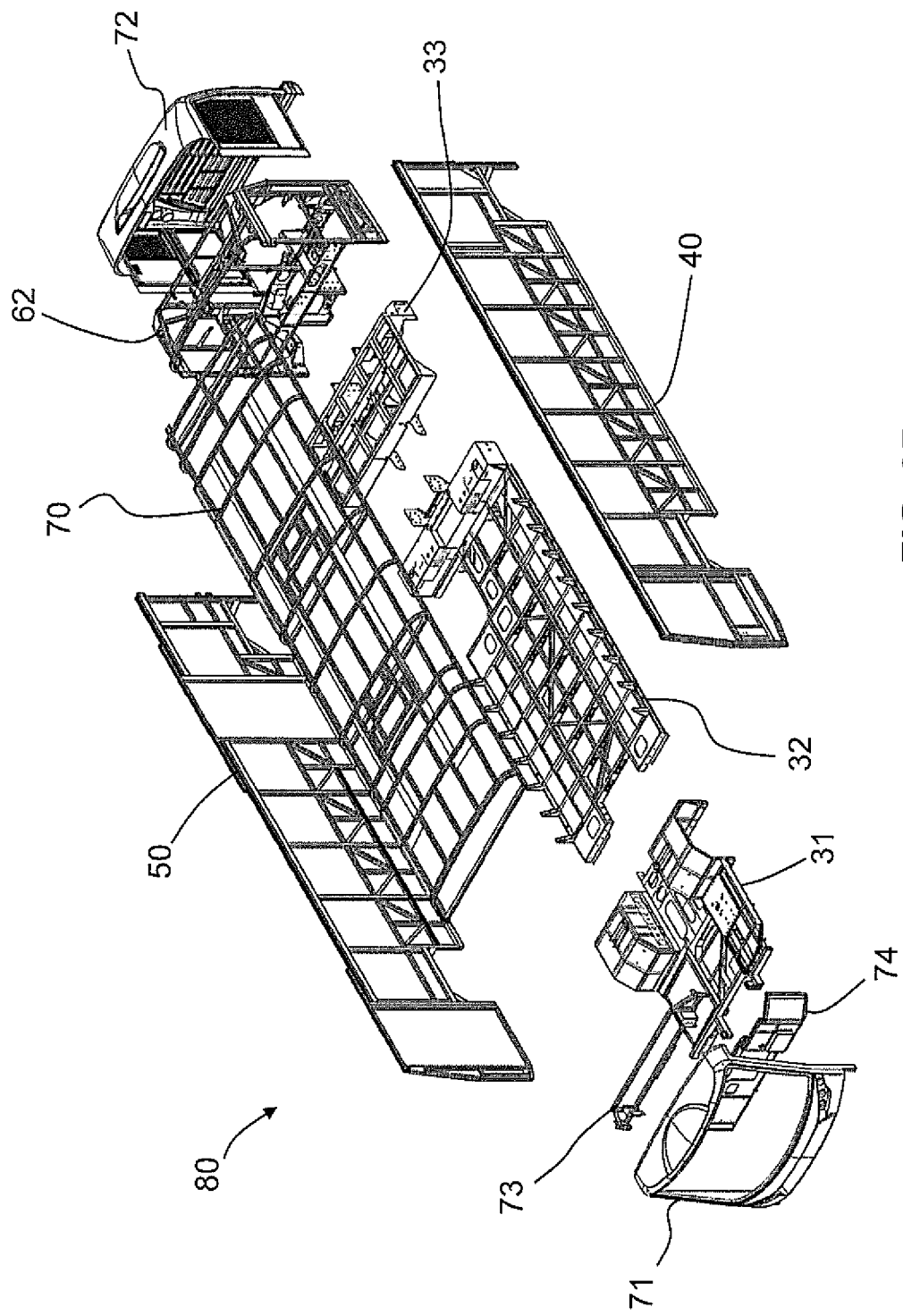
FIG. 3B is an exploded orthographic view of the fabricated vehicle assembly of FIG. 3A.

Referring now to FIGS. 3A and 3B, there are shown orthographic views of a vehicle and power train assembly 80 in both assembled (FIG. 3A) and disassembled or exploded states (FIG. 3B). Vehicle and power train assembly 80 may form the partial or overall support structure for vehicle 10 and, as described herein, may itself comprise one or more discrete sub-assemblies. For example, vehicle and power train assembly 80 may include base chassis 30, left and right sidewall assemblies 40, 50 to either side of base chassis 30, and a roof assembly 70 supported on left and right sidewall assemblies 40, 50 above base chassis 30. Power train module 60 is affixed within vehicle and power train assembly 80 at the back of the vehicle 10. Cab assembly 100 may also be affixed within vehicle and power train assembly 80 at the front of vehicle 10. As seen in FIG. 3B, basis chassis 30 may itself also include a front module 31, midframe module 32, and rear module 33 in different embodiments. Further details of these components are provided below.

In some embodiments, base chassis 30, left and right sidewall assemblies 40, 50, roof assembly 70, and power train module 60 can each be formed out of steel plate and tube elements, for example, but also different metals or materials that exhibit similar structural characteristics. These may include aluminum, stainless steel, and others without limitation.

Vehicle and power train assembly 80 may further include front cross brace 73 and front firewall assembly 74 forward of base chassis 30 within front assembly 100. Front body cap 71, which includes a frame for the vehicle windshield, may also be included forward of front cross brace 73 and front firewall assembly 74 within front assembly 100. At the opposite end of vehicle 10, power train module 60 may include a power train module frame 62 and rear body cap 72 as described further below.

Figure 4:
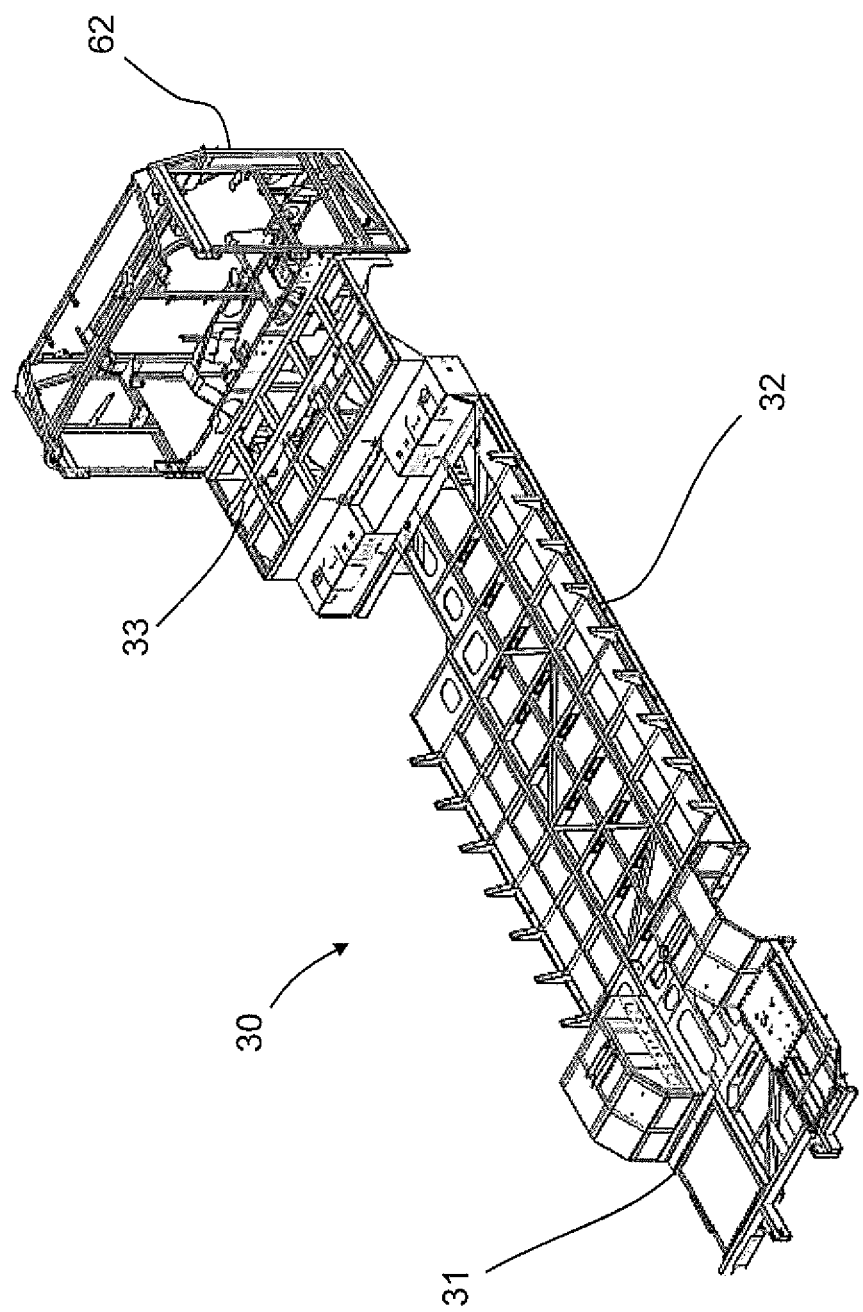
FIG. 4 is an orthographic view showing the assembled elements of a vehicle chassis.

Referring now to FIG. 4, base chassis 30 is shown in affixed to power train module frame 62 in isolation from other elements of vehicle and power train assembly 80. Although shown assembled together, base chassis 30 and power train module frame 62 are discrete, structural elements within vehicle and power train assembly 80 independently of each other. As described further below, one or more interconnections between base chassis 30 and power train module frame 62 can be provided, for example, by way of mechanical fasters or other permanent or semi-permanent joints. This configuration imparts structural strength and rigidity to vehicle 10, while at the same time allowing modular or sequential assembly of different sub-assemblies.

Figure 5A:
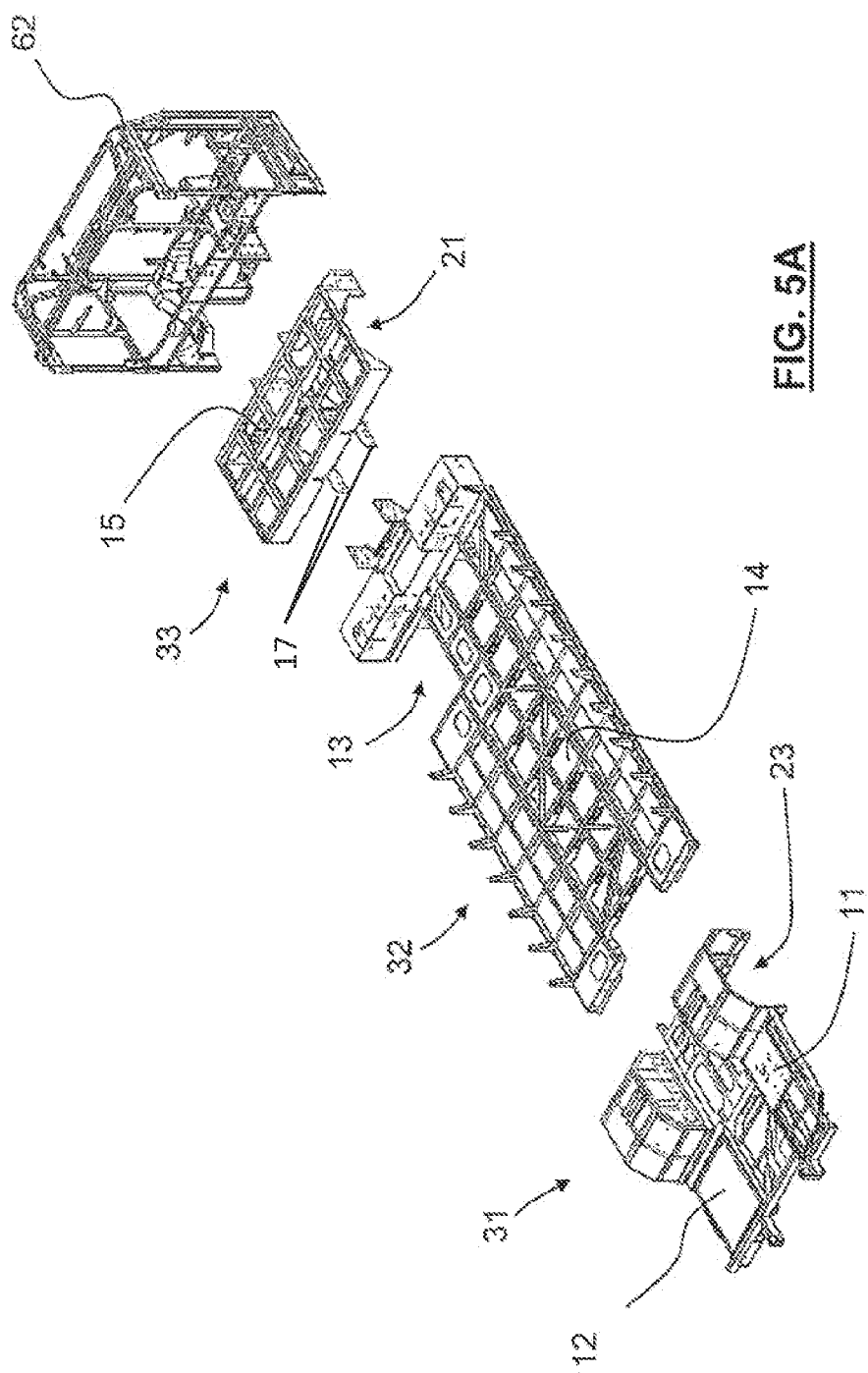
FIGS. 5A and 5B are exploded orthographic and side views showing the elements of a vehicle chassis prior to assembly.
Figure 5B:
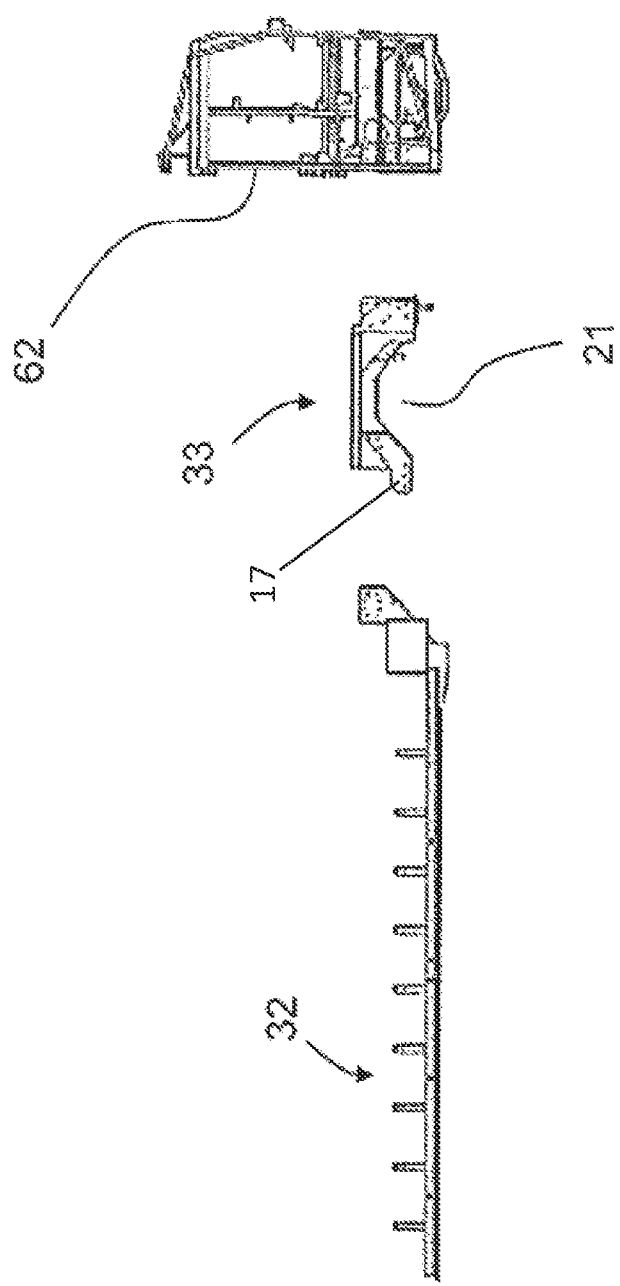

Referring now to FIGS. 5A and 5B, base chassis 30 is shown in exploded form in both orthographic (FIG. 5A) and side plan (FIG. 5B) views. As shown, in some embodiments, base chassis 30 may include at least two and in some cases at least three discrete sub-assemblies. These may include a front module 31 that is shaped to accommodate operator station 11 and entry/egress area 12, as well as a contour 23 for mounting front module 31 onto a steering axle (not shown). Front module 31 may have a substantially flat profile from entry/egress area 12 to between the steering axle mounting contour 23, which provides a generally flat floor for passenger movement from a doorway through to a main passenger area 14 (FIG. 1).

In alternative embodiments, entry/egress area 12 may incorporate a slight slope of up to 2 degrees or more, for example. Incorporation of a slight slope can assist in the removal of water or ice from within vehicle 10 that may have accumulated during operation as passengers enter and exit. Additionally, a slight slope may also lower the entry step height of the vehicle 10 to assist passengers with mobility issues getting on or off the vehicle 10.

In some embodiments, the operator station area 11 and the entry/egress area 12 may be mirrored across the X-X' axis. Such a configuration might, for example, provide a vehicle configuration suitable for geographic regions that require operation of a vehicle on the left side of a street. In some embodiments, the entry/egress area 12 may be omitted altogether from vehicle 10. These and other variations of configuration and construction of the front module 31 may be incorporated into vehicle 10 without limiting the scope of the described embodiments.

In some embodiments, base chassis 30 may further include a midframe module 32 aft of and connected to front module 31. Midframe module 32 may, for example, incorporate a substantially open flat surface or profile in a central region that provides the foundation for a flat floor for passenger area 14. Midframe module 32 is depicted in FIGS. 5A and 5B as having a particular length in the axial direction, although longer or shorter lengths than what is shown may be possible as well. In some cases, different midframe modules 32 may be designed so as to be interoperable within a vehicle 10 and the choice of which configuration to include may be a selection made by a manufacturer or assembler of vehicle 10.

Midframe module 32 may in some case incorporate a cutout section that accommodates, optionally, second entry/egress area 13. However, in some cases, the entry/egress area 13 may be omitted from vehicle 10, in which case the cutout section seen in FIG. 5A would also be omitted and midframe module 32 would be a mirror image about the X-X' axis. In general, the location of entry/egress area 13 may be varied, including anywhere along either side of the midframe module 32, depending on the particular application or design considerations. In addition, a plurality of entry/egress areas 13 may be included in different embodiments of vehicle 10. These and other variations of configuration and construction of the midframe module 32 may be incorporated into vehicle 10 in accordance with the described embodiments.

In some embodiments, base chassis 30 may include a rear module 33 aft of and connected to midframe module 32 if included in vehicle 10. Rear module 33 may, for example, incorporate a raised area 21 overtop of a component used for the mounting of a driven axle and a plurality of longitudinal support members 17. Rear module 33 may also be configured so as to provide interconnection with power train module frame 62 located aft of the rear module 33 and which is separable and structurally independent therefrom.

As illustrated in FIGS. 5A and 5B, the relationship between the various discrete sub-assemblies of vehicle and power train assembly 80 is such that vehicle 10 may, through configuration and interconnection of different modules, be configured to have different characteristics as needed or desired to suit different design objectives or applications. For example, the length of midframe module 32 may be varied so as to realize a passenger area that accommodates different quantities of passengers without altering the size or configuration of front module 31 or rear module 33. Additionally, in some embodiments, the size or structure of front module 31 may be modified to accommodate a different axle arrangement without requiring alteration to midframe module 32 or rear module 33. Similarly rear module 33 may be modified for whatever reason without requiring alteration to midframe module 32 or front module 31.

Further, in some embodiments, one or more additional base chassis modules may be interposed between any one or more of front module 31, midframe module 32, or rear module 33. This can be accomplished through design of modules that have aligned/mating joint elements 17 as described further herein. For example, an additional extending module can be constructed to interface with the mechanically fastened joints of front module 31 and midframe module 32 (which might otherwise be themselves fastened together). Assembly and connection of such additional module within vehicle 10 between front module 31 and midframe module 32 can be used to extend the wheelbase of base chassis 30. Such an additional module might also be desirable in order to reduce the length of midframe module 32 and thereby facilitate inventory by vehicle manufacturer as compared to larger components that would require more storage space. In general, the number, types, or configurations of modules or subassemblies that may be incorporated into base chassis 30 for any other reason are not limited.

Figure 6:
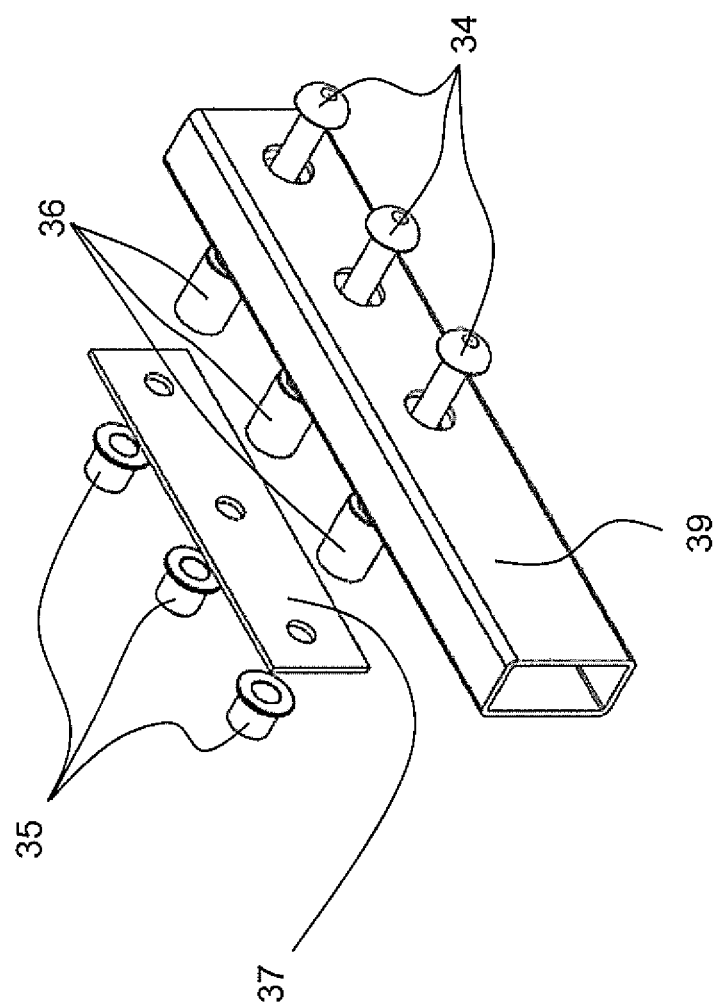
FIG. 6 is an exploded orthographic view of elements of a bolted joint assembly.

Referring now to FIG. 6, there is shown an exploded orthographic view of a mechanically fastened clamping joint that may be used to fasten together one or more different subassemblies of a base chassis 30 within vehicle 10. In some embodiments, the joint may be formed by retaining tube or plate elements from the subassemblies to be joined together, each fashioned with through holes, between the heads of lockbolts 34 and a tube element 39. Round tubular sleeves 36 can be inserted into clearance holes in an opposing side of tube element 39. Once in place, lockbolts 34 can then be inserted through the round tubular sleeves 36. A backing plate 37 may be placed on the opposing side of tube 39 and retaining collars 35 are installed on the shafts of lockbolts 34. Optionally, a hydraulic apparatus, for example, can be used to permanently deform retaining collars 35 once installed in order to provide a permanent, vibration free joint. In the configuration shown, tubular sleeves 36 and backing plate 37 serve to distribute the clamping load of the lockbolts 34 through the tube element 39 to resist deformation and/or crushing and to provide an adequate and permanent joint. In an alternative arrangement, lockbolts 34 and retaining collars 35 may be replaced by threaded bolts and nuts.

Figure 7:
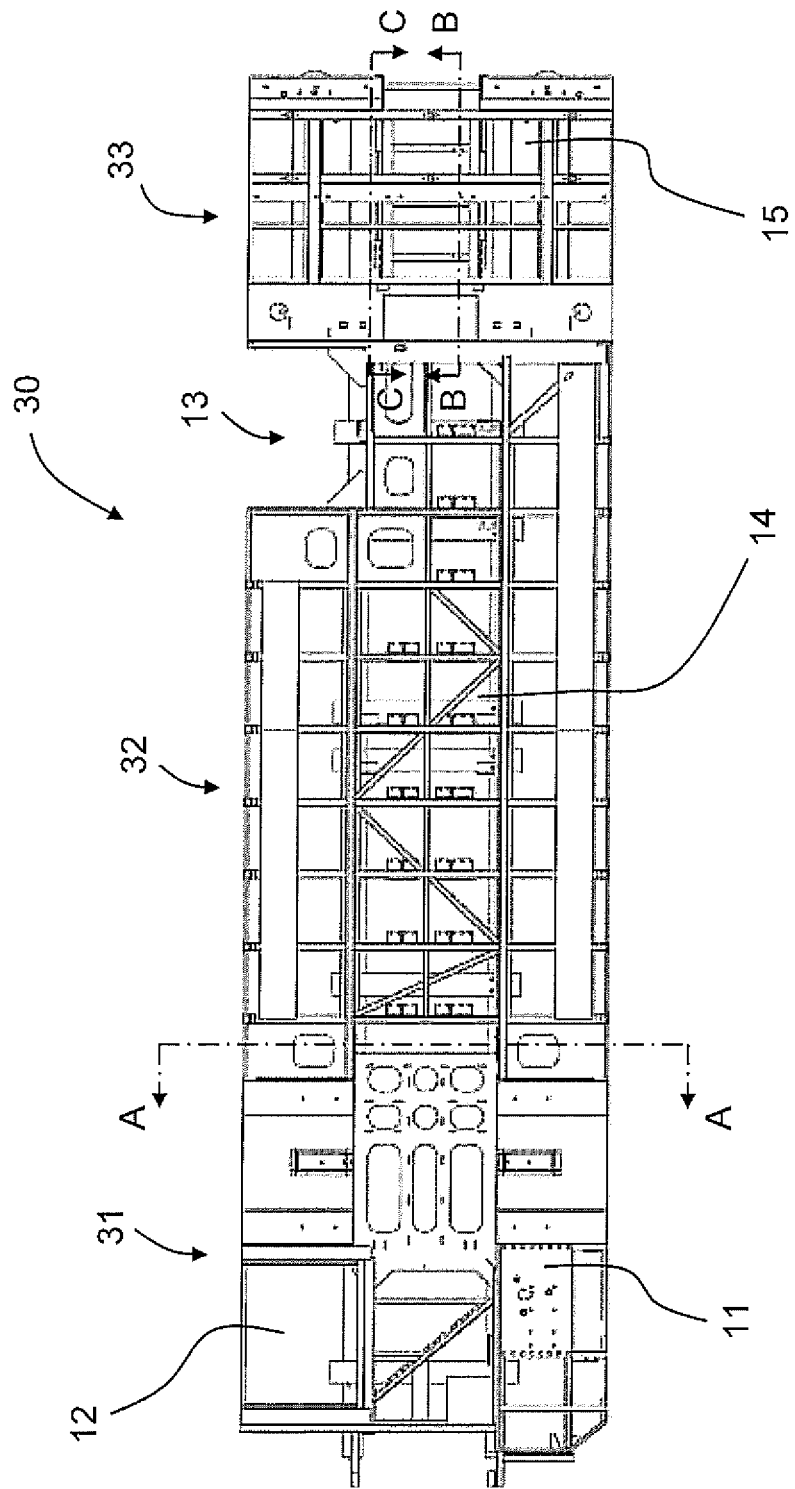
FIG. 7 is a top plan view of a vehicle chassis.

Referring now to FIG. 7, there is shown a top plan view of base chassis 30 with front module 31, midframe module 32, and rear module 33 mechanically fastened together in accordance with the described embodiments. In the depicted configuration, embodiments of the mechanical joint shown illustrated in FIG. 6 may be used to provide interconnection between the front module 31 and midframe module 32 and between midframe module 32 and rear module 33, respectively, each as described further below. While each interconnection may be based on or include one or more mechanical joints, the locations and numbers of joints may differ as applicable based on the shape of the modules being joined.

Figure 8:
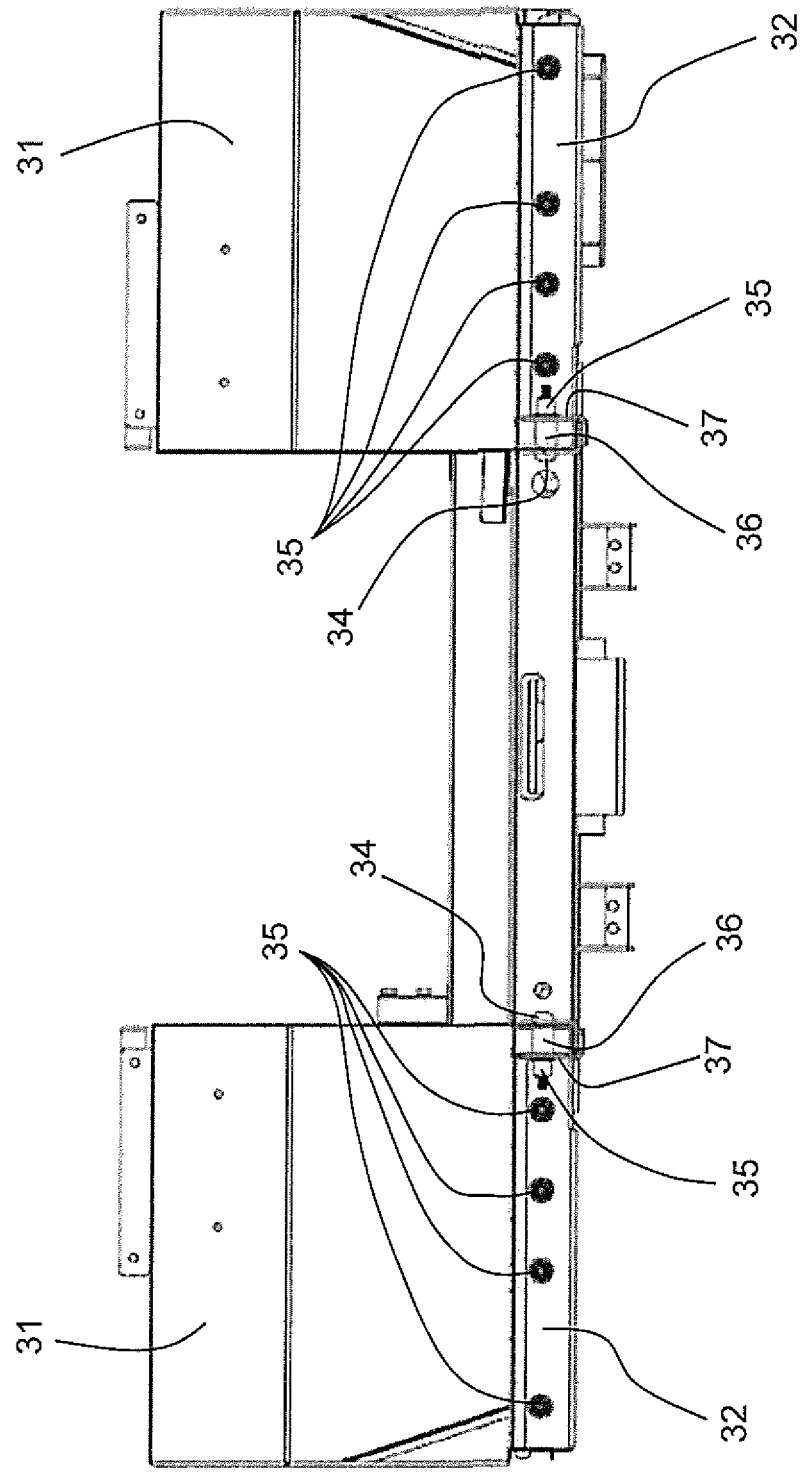
FIG. 8 is a rear view of the vehicle chassis shown in FIG. 7 along cross section A-A, illustrating regions of a bolted connection.

FIG. 8 depicts base chassis 30 along the section view A-A indicated in FIG. 7, illustrating a mechanically fastened joint between front module 31 and midframe module 32. Lockbolts 34 are shown aligned with the transverse Y-Y' axis, clamping a longitudinally oriented plate element of front module 31 to a longitudinally oriented tube of midframe module 32. Tubular sleeves 36 can be seen inside the longitudinal tubes of midframe module 32, and backing plates 37 and retaining collars 35 are illustrated on the outsides of the longitudinal tubes. These various elements cooperate together to form part of a bolted joint. In the configuration shown in FIG. 8, a series of four retaining collars 35 are also included along transversely oriented tubes of midframe module 32 on each side of vehicle 10, although other numbers and/or arrangements of retaining collars 35 may be included in different embodiments.

Figure 9:
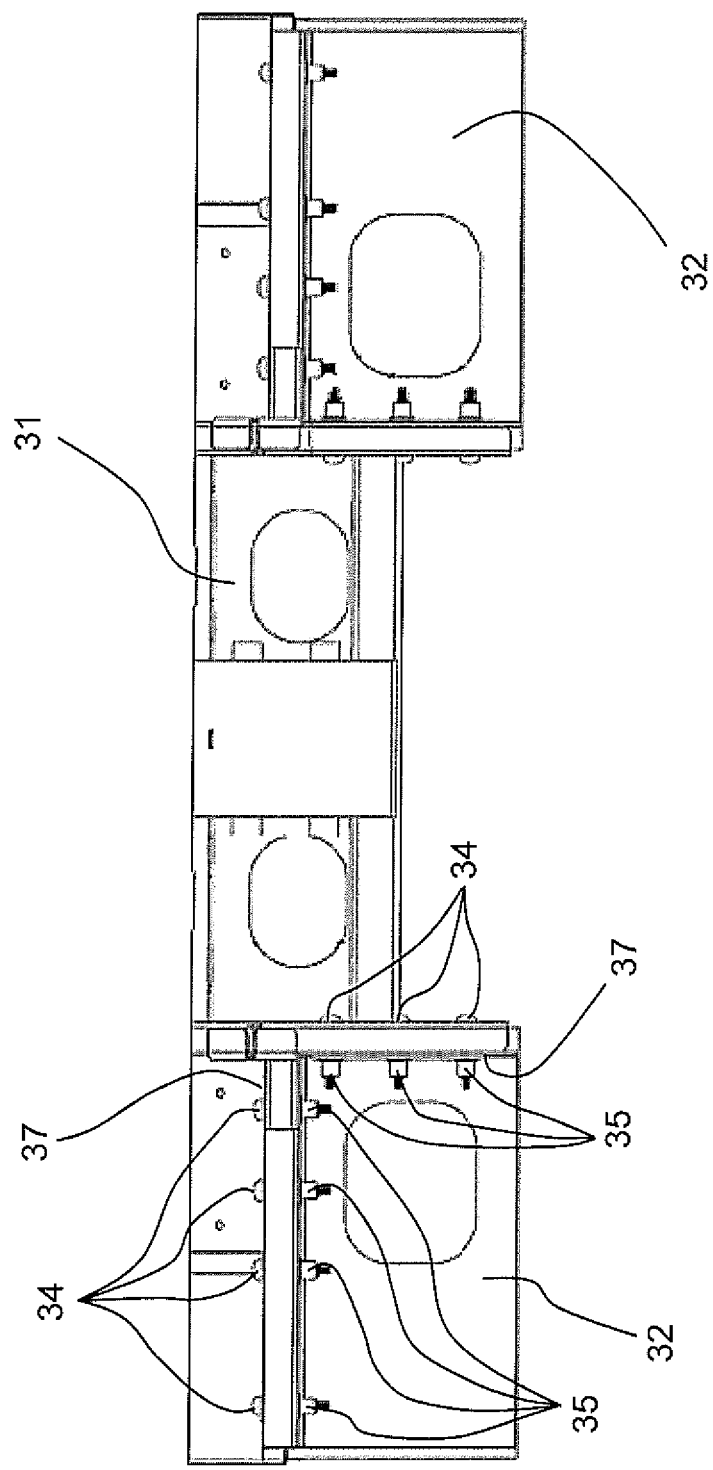
FIG. 9 is bottom plan view of the bolted connection seen in FIG. 8, showing the interlocking elements and mechanical fasteners.

FIG. 9 is a bottom plan view of the joining interface between front module 31 and midframe module 32 shown in FIG. 8, with the mechanical joint elements depicted in further detail. Lockbolts 34 are arranged along joining surfaces between longitudinal tubes of midframe module 32 and longitudinal plates of front module 31. Backing plates 37 and retaining collars 35 may also be included in some cases. As shown, lockbolts 34 with backing plates 37 under their heads clamp transverse tubes of front module 31 to transverse plates of midframe module 32 and are retained by retaining collars 35. In this way, front module 31 is mechanically inserted into midframe module 32 and is retained in both the longitudinal and transverse directions thereby adding structural stability to the joint.

FIGS. 10A and 10B illustrate side section views B-B and C-C indicated in FIG. 7, respectively, showing mechanical interconnection between midframe module 32 and rear module 33 of base chassis 30 from opposite longitudinal directions. In FIG. 10A, the interconnection is shown as viewed along the Y-Y' axis from one lateral side of vehicle 10, while FIG. 10B shows the interconnection as viewed from the other side. As can be seen, the number and orientation of mechanical connections is this structural joint differs from that formed between front module 31 and midframe module depicted in FIGS. 8 and 9.

Figure 11B:
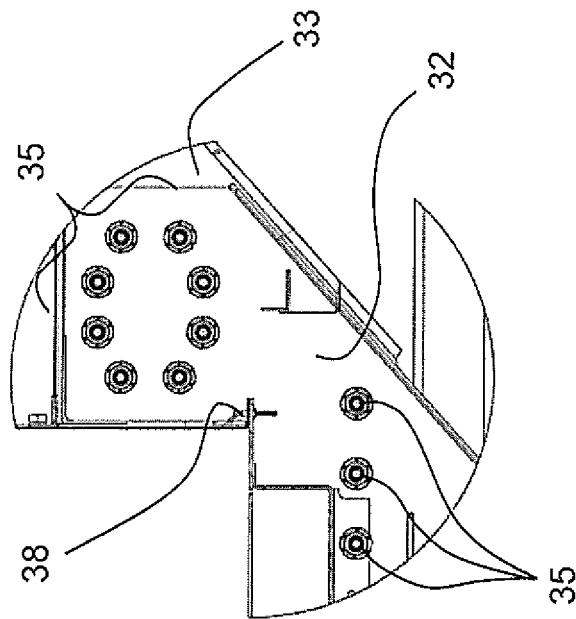
FIG. 11B is a close-up view of the bolted connection shown in FIG. 10B.
Figure 11A:
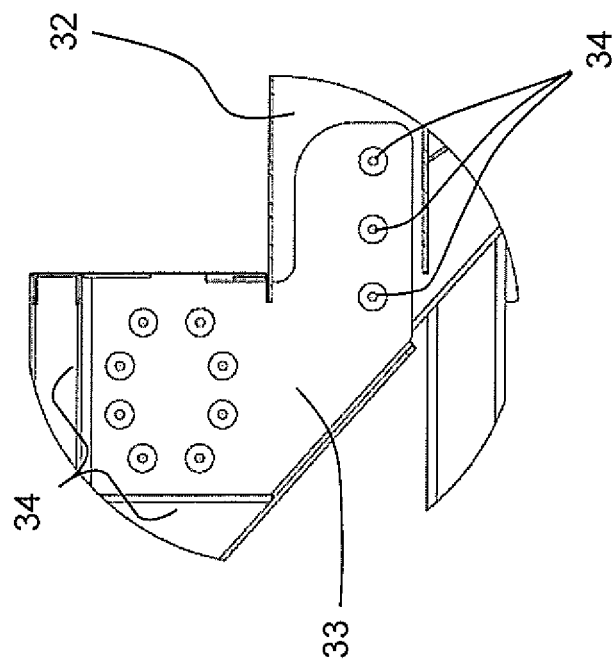
FIG. 11A is a close-up view of the bolted connection shown in FIG. 10A.

FIG. 11A is a close up of the reference view D indicated in FIG. 10A. As shown, in some embodiments, a longitudinally oriented plate element of rear module 33 is clamped to a longitudinally oriented plate element of midframe module 32. Lockbolts 34 are used to retain the plate elements and may themselves be secured by mating retaining collars thereby forming a fixed and structurally sound joint. While connection is made between respective plates of rear module 33 and midframe module 32 in the example embodiment shown, in some cases, connection may alternatively be formed between mated tube and plate elements as described herein.

FIG. 11B is a close up of the reference view E in indicated in FIG. 108 and depicts another embodiment of a mechanical joint. As shown, a longitudinally oriented plate element of rear module 33 is clamped to a longitudinally oriented plate element of midframe module 32. Retaining collars 35 secured over mating lockbolts are used to clamp the plates together in a fixed joint. In addition, in this embodiment, structural blind rivets 38 join a horizontal flanged plate of midframe module 32 to a mating folded flange on rear module 33. Optionally, in some embodiments, lockbolts 34 and the retaining collars 35 may be replaced by threaded bolts and nuts. Blind structural rivets 38 may also in some cases be replaced by threaded bolts and nuts. In general, the size, shape and configuration of the mating elements and the number and type of fasteners may be varied in different embodiments of the invention.

Referring now to FIG. 12, there is an orthographic view of a fabricated vehicle assembly 81 including base chassis 30, left and right wall assemblies 40, 50, and roof assembly 70 fastened together. Interconnections between subassemblies of fabricated vehicle assembly 81 may be made by way of one or more mechanical joints as described herein. Fabricated vehicle assembly 81 may be combined with power train module 60 and cab assembly 100 to form vehicle and power train assembly 80 as shown, for example, in FIG. 5A.

Figure 13B:
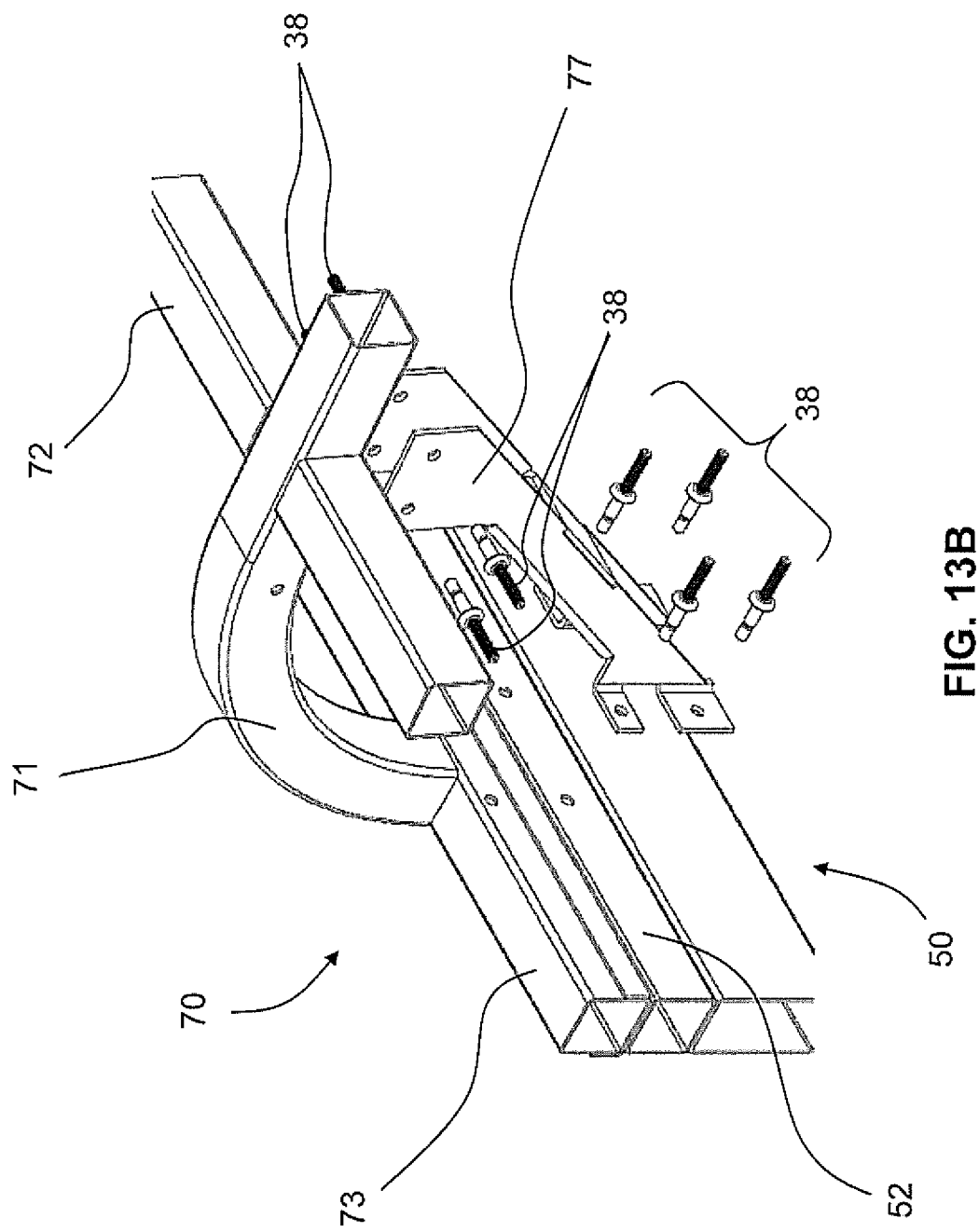

FIGS. 13A and 13B are close-ups of reference view F indicated in FIG. 12 showing an example mechanical joint between fabricated roof assembly 70 and a sidewall assembly, in this case left sidewall assembly 40. The joint is shown in FIG. 13B in exploded isometric view and from a different angle. A mirrored configuration of the same connection may, however, also be used to provide a connection between roof assembly 70 and right sidewall assembly 40. As shown, transverse roof bow 71 of roof assembly 70 is integrally connected to longitudinal roof tubes 72 and 73, also included in roof assembly 70, for example, by way of a welded joint. Angled support bracket 77 may be placed on roof bow 71 and abutting both longitudinal roof tube 73 of roof assembly 70 and longitudinal sidewall tube 42 of left sidewall assembly 40. One or more structural blind rivets 38 may be inserted through holes in 77 and into holes in 71 and 73 in order to fasten together roof assembly 70 and left sidewall assembly 40.

Figure 14:
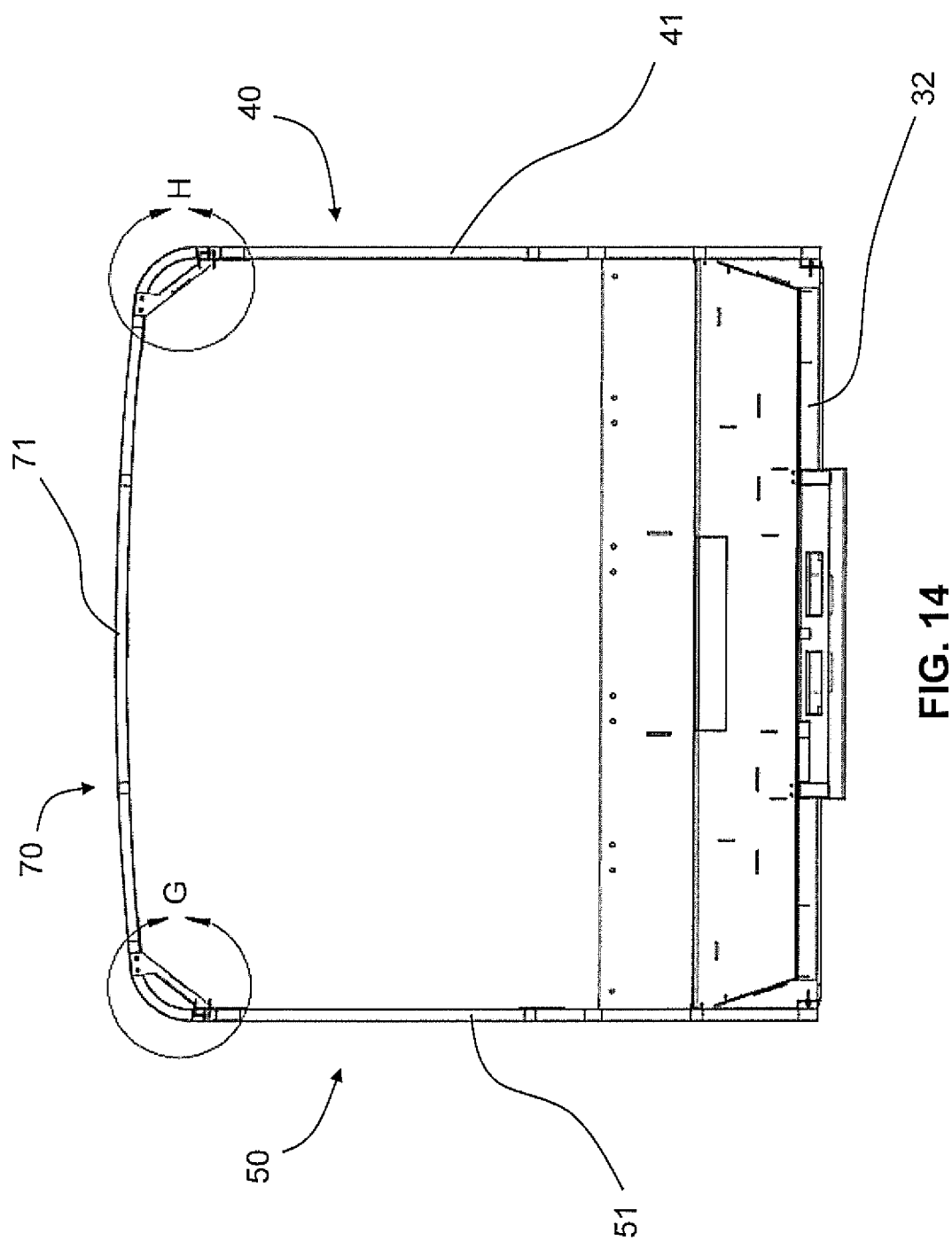
FIG. 14 is a front plan view of a section of the fabricated vehicle assembly base portion of FIG. 12, showing mechanically fastened joints between the roof and sidewall elements.

Referring now to FIG. 14, there is shown a front plan view of a section of a fabricated vehicle assembly 81 illustrating mechanically fastened joints between the roof assembly 70, left sidewall assembly 40, and right sidewall assembly 50. Left sidewall assembly vertical tube element 41 is shown to be in the same reference plane YZ as roof bow 71. Similarly, right sidewall assembly vertical tube element 51 is shown to be in the same reference plane YZ as roof bow 71. In this way, structural loads may pass from midframe module 32 up tubes 41 and 51 and be resolved in roof bow 71 in a continuous or near continuous pathway.

At detail view reference G, an angled support bracket 77 supports and gussets the load pathway from tube 51 to roof bow 71. Similarly, at detail view reference H, an angled support bracket 77 supports and gussets the load pathway from tube 41 to roof bow 71. In some cases, this configuration of bracket 77 can reinforce and reduce bending at the joint at areas G and H where loads are applied to the side or roof of the vehicle 10, such as during a rollover of the vehicle. Further, reinforcement of the joint at areas G and H can improve torsional rigidity of the vehicle structure along the X-X' axis.

Figure 15B:
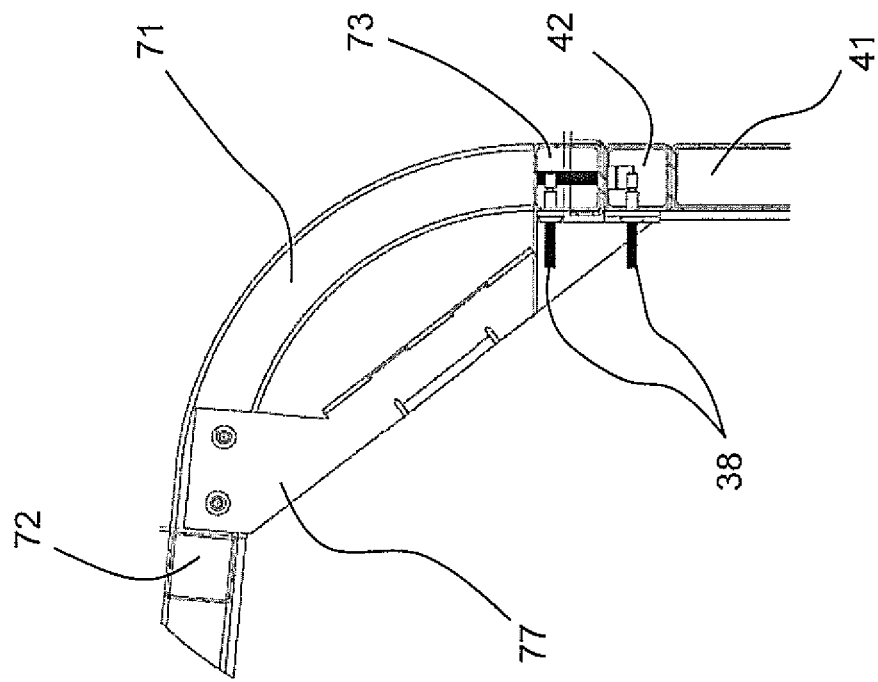
FIGS. 15A and 15B are close-up views of the mechanically fastened joints shown in FIG. 14, illustrating the interrelated elements.
Figure 15A:
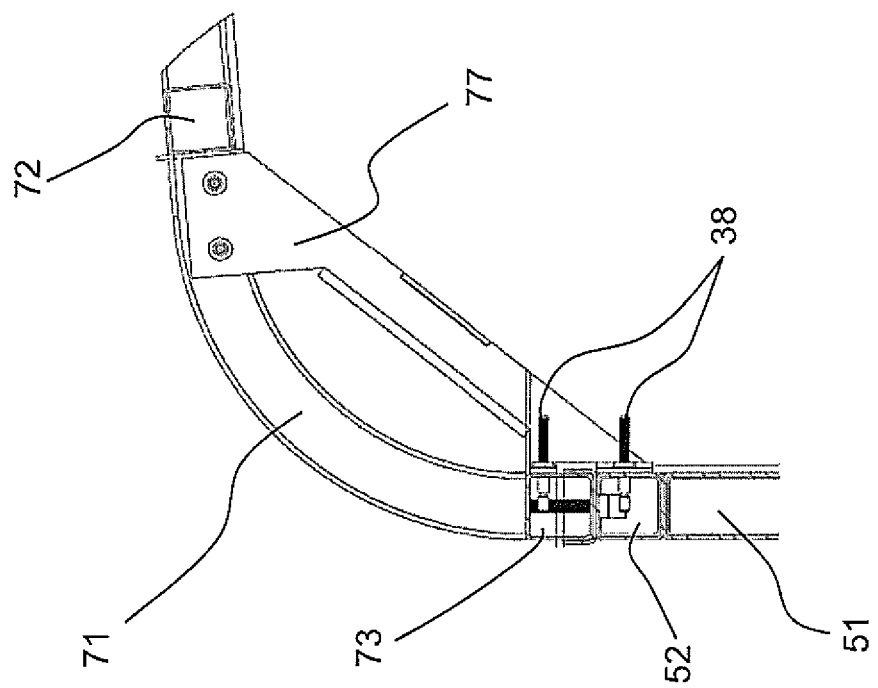

FIGS. 15A and 15B are close-ups of reference views G and H indicated in FIG. 14, respectively. As seen in FIG. 15A, angled support bracket 77 may be used to retain transverse roof bow 71 between two flat plate flanges. The flanges of angled support bracket 77 are oriented so that an edge abuts longitudinal roof tube 72 for reference in assembly. A second set of flanges, orthogonal to the first set of flanges, buttresses the joint located between longitudinal roof tube 73 and right longitudinal sidewall tube 52. The structure of the flanges of angled support bracket 77 is such that the contact intersection between the two tubes is bridged. Structural blind rivets 38 are shown inserted into through holes between 77 and roof bow 71, roof tube 73, and sidewall tube 52, thereby joining and reinforcing the fixed orientation of roof bow 71, roof tube 73, and right longitudinal sidewall tube 52 to each other. FIG. 15B is a mirror image of the configuration seen in FIG. 15A and differs in that connection is made to left longitudinal sidewall tube 42 as opposed to right longitudinal sidewall tube 52. The structural joint seen in references view G and H may, in some cases, be the same joint that is illustrated in FIGS. 13A and 13B Inclusion of angled bracket 77 in the described embodiments provides gusseted reinforcement of the mechanical joint between left and sidewall assemblies 40 and 50 and roof 70 using a bracket that is mechanically fastened instead of welded, and which may be added after vehicle components have been assembled together. This approach has advantages as compared to bus constructions that make use of a welded angular tube or plate to provide gusseted reinforcement between sidewall wall and roof assemblies. In particular, but without limitation, the approach herein allows for sidewall assemblies to be fabricated flat for ease of surface material application prior to installation. Further, skilled welding operations in at least some cases will not be required for the purpose of reinforcing the installed joint.

Figure 16:
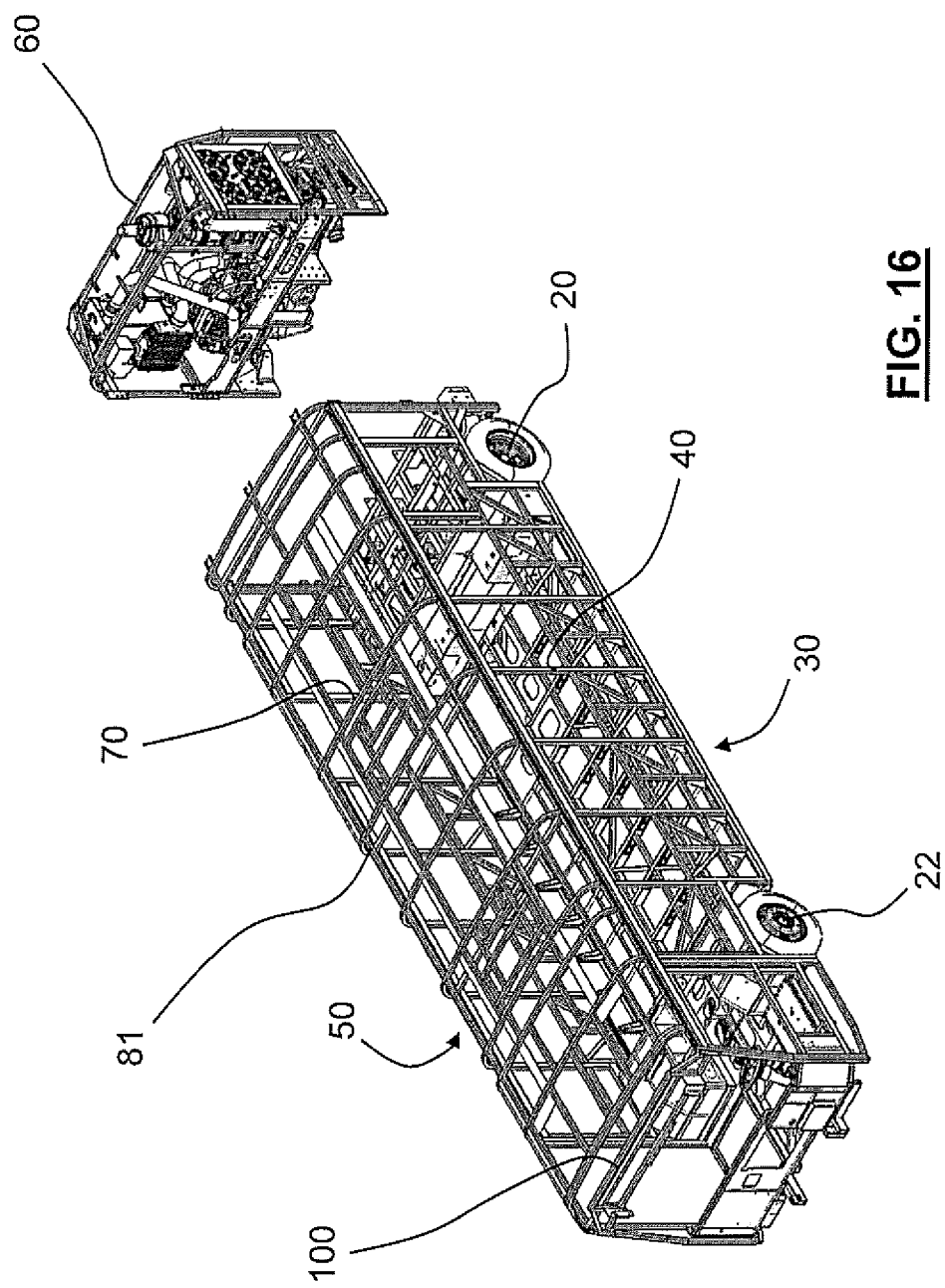
FIG. 16 is an exploded orthographic view of a base vehicle module and a power train module.

Referring now to FIG. 16, there is shown an orthographic view of a fabricated vehicle assembly 81 in accordance with the described embodiments together with a mechanically separate, assembled power train module 60. Fabricated vehicle assembly 81 is shown supported on a driven axle 20 and a steering axle 22. Power train module 60, while shown as a mechanically separate component, can be mechanically joined to fabricated vehicle assembly 81 within a vehicle 10 as described herein.

Figures 17A, 17B:
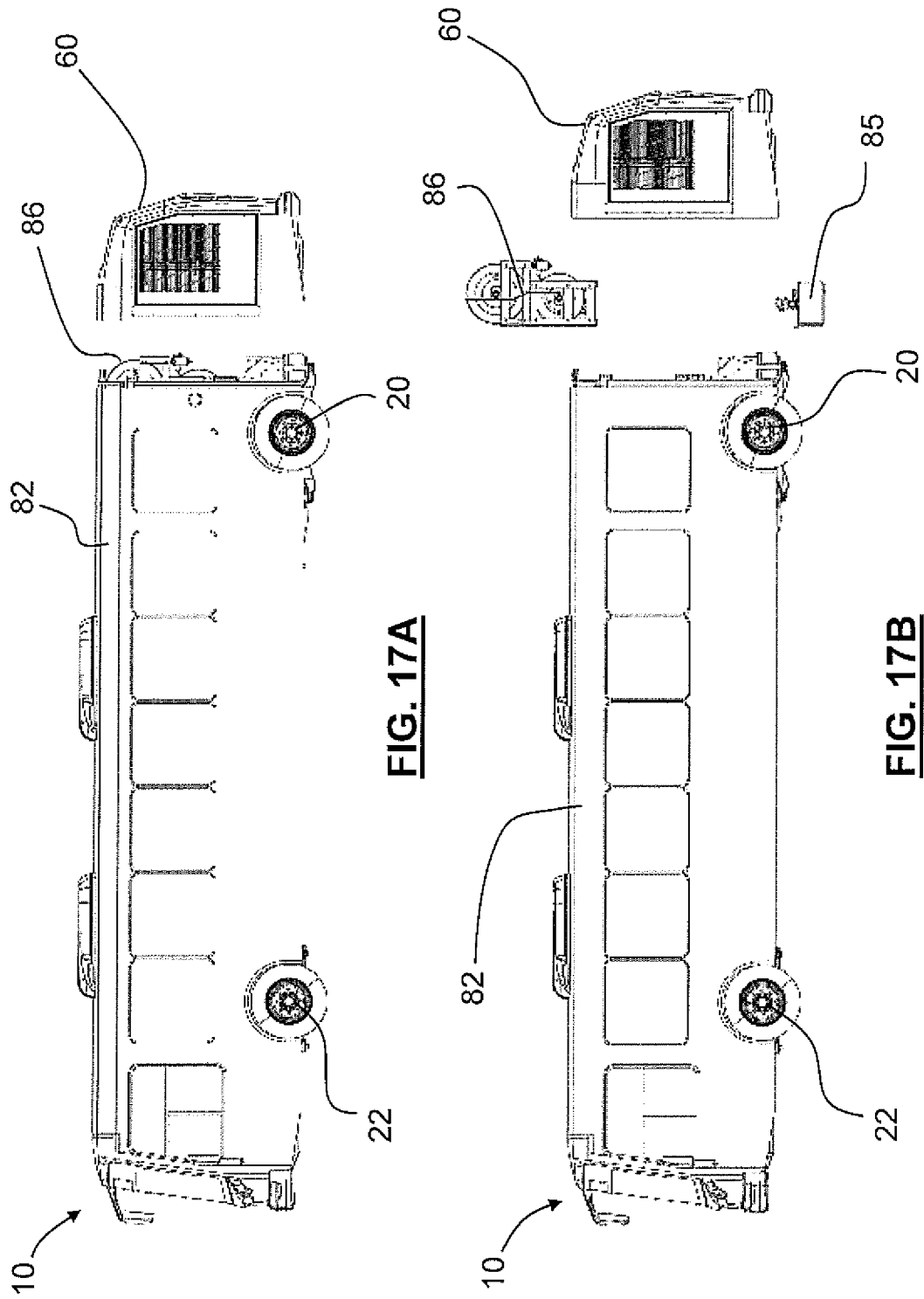
FIGS. 17A and 17B are exploded side views of alternative embodiments of the base vehicle module and power train module shown in FIG. 16 illustrating different fuel storage elements that may be installed on a vehicle.

Referring now to FIGS. 17A and 17B, fabricated vehicle assembly 81 may provide the underlying support structure for a vehicle module 82, which may also be physically separate and independent of power train module 60. Because power train module 60 may be manufactured separately of vehicle module 82 and affixed later on during assembly of vehicle 10, vehicle module 82 is capable of incorporating different types and configurations of power train components in different embodiments. FIG. 17A, for example, shows a side view of vehicle module 82 incorporating a natural gas fuel storage tank 86. The mechanically separate nature of power train module 60 in relation to vehicle module 82 can again be seen in that vehicle module 60 is detachable from vehicle module 82 thereby providing accessing to the interior space in which natural gas fuel storage tank 86 may be housed.

FIG. 17B shows a side view of an alternative embodiment of vehicle module 82, in which a diesel fuel storage tank 85 as well as a natural gas fuel storage tank 86 may be included. This configuration may be utilized in embodiments where power train module 60 is equipped with a diesel burning engine, and diesel fuel storage tank 85 may be housed in the space between the vehicle module 82 and the power train module 60. In other embodiments where power train module 60 is equipped with a natural gas burning engine, natural gas fuel storage tank 86 may be housed in the space between the vehicle module 82 and the power train module 60 as seen in FIG. 17A. In this manner, the separable nature of the vehicle module 82 and the power train module 60 may facilitate substitution of different fuel storage elements of various configurations and/or characteristics in the vehicle module 82. This approach may also provide for the inclusion in a vehicle 10 of other types and/or number of fuel storage elements not specifically described herein.

Referring now to FIGS. 18A and 18B, there are shown rear and front orthographic views of a power train module 60, respectively, in accordance with the described embodiments. As shown, power train module 60 may comprise a power train module fabricated structure 62 that provides a support structure in which different components of power module 60 may be housed and supported. In some embodiments, fabricated structure 62 may be provided with at least secondary mounting plates 65 and mounting flanges 66 arrayed around the leading perimeter to allow for structural attachment to, for example, fabricated vehicle assembly 81 of motor vehicle 10.

In some embodiments, as shown, power train module 60 can include a power train assembly 90 comprising engine 91, transmission 100, and an intermediate gearbox 99 among other components. Radiator 93, charge air cooler 94, exhaust aftertreatment element 92, starting batteries 95, and electrical panel 102 may also be supported within power train module fabricated structure 62 in different locations based on function and proximity to the power train assembly. In some cases, these components may be supported above the power train assembly 90.

As seen in FIG. 18B, power train module fabricated structure 62 may in some cases be provided with primary mounting plates 63 and 64 supported on a crossbeam in a lower central area of fabricated structure 62, as well as secondary mounting plates 65 and mounting flanges 66 arrayed around the leading perimeter to allow for structural attachment to fabricated vehicle assembly 81 of motor vehicle 10. Also shown are intermediate gearbox 99, which can be attached to the power train assembly, as well as radiator 93, air filter assembly 96, diesel exhaust fluid tank 97, air dryer assembly 98, and hydraulic tank 101 attached to the power train module fabricated structure 62. Again, in some cases, these components may be connected above the power train assembly 90.

As seen in FIGS. 18A and 18B, the described embodiments may facilitate the independent assembly of power train module 60 and subsequent installation onto a vehicle 10. Independent assembly of power train module 60 can reduce or eliminate the requirement to install the power train elements directly to or within vehicle module 82. Instead power train module 60 may be mated to vehicle module 82 at different points or stages within the vehicle assembly process. Independent assembly of the separable power train module 60 may further allow access to a majority or even all components retained within from multiple sides including the mounting side, rather than only via the sides of the module 60 that are exposed once installed on the base vehicle.

Figure 19B:
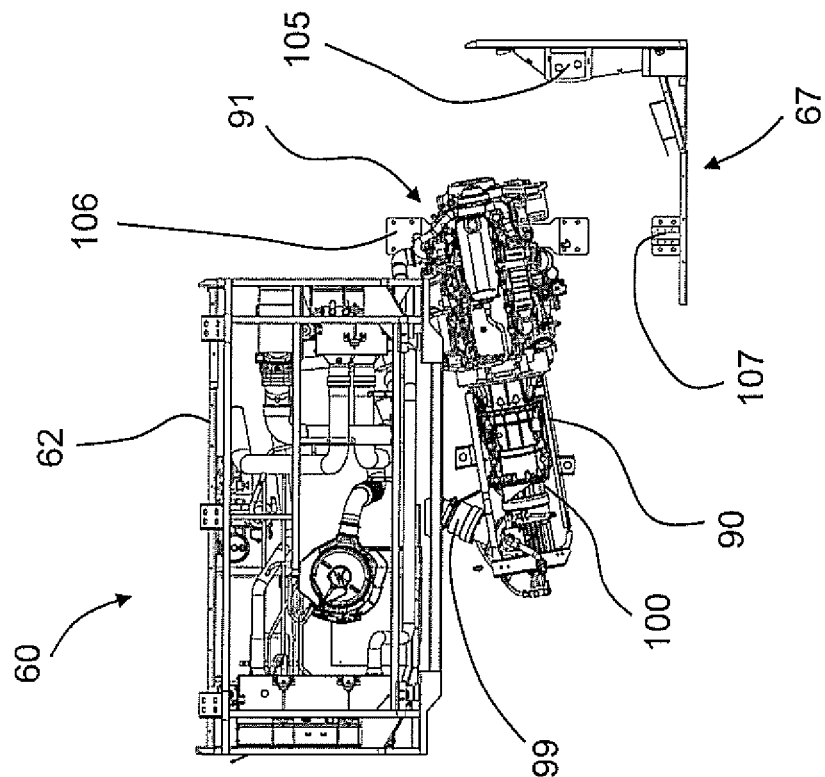
FIGS. 19A and 19B are exploded rear orthographic and top plan views of a power train module.
Figure 19A:
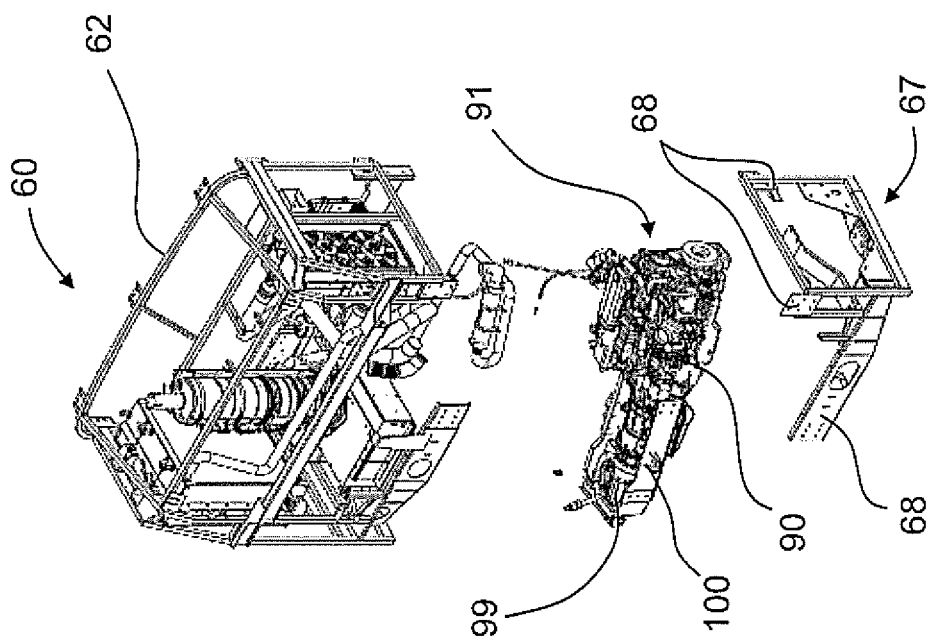

Referring now to FIGS. 19A and 19B, there is shown an example embodiment of a power train module 60 in exploded rear orthographic and top plan views, respectively. As shown, power train module 60 includes a power train module fabricated structure 62, but with separable fabricated support element 67 shown detached from power train module fabricated structure 62. In some embodiments, support element 67 may include one or more joining plates 68 that provide mechanical fastening to power train module fabricated structure 62. In addition, power train assembly 90 comprising engine 91, transmission 100, and intermediate gearbox 99 may be removably installed within power train module 60 as illustrated.

As seen in FIG. 19B, for example, separable support element 67 may in some embodiments include front engine mount 105 for attachment of engine 90, as well as a cross brace mount 107 for attachment of separable cross brace 106. The separable or detachable nature of support element 97 and cross brace 106 may allow for advantageous removal of power train assembly 90 from power train module 60, without requiring the removal of power train module 60 or power train module fabricated structure 62 from the vehicle 10. Likewise other elements of power train module 60 may through use of support element 97 not require removal from power train module 60 in order to access and remove power train assembly 90. This may, for example, facilitate service or other repair of power train module 60 and/or power train assembly 90.

Figure 20A:
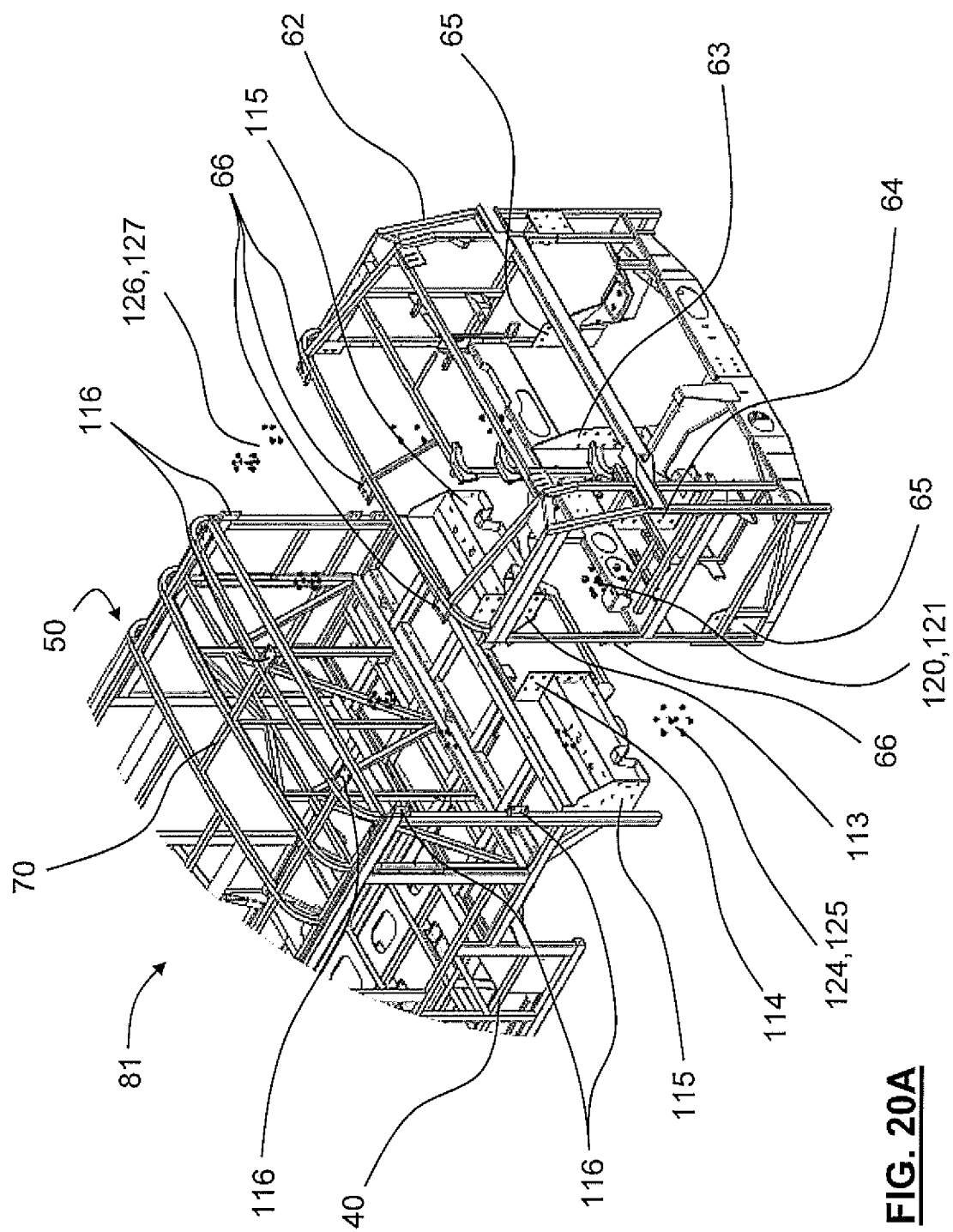
FIG. 20A is an exploded rear orthographic view of the rear portion of the base vehicle fabricated structure and the power train module fabricated structure.
Figure 20B:
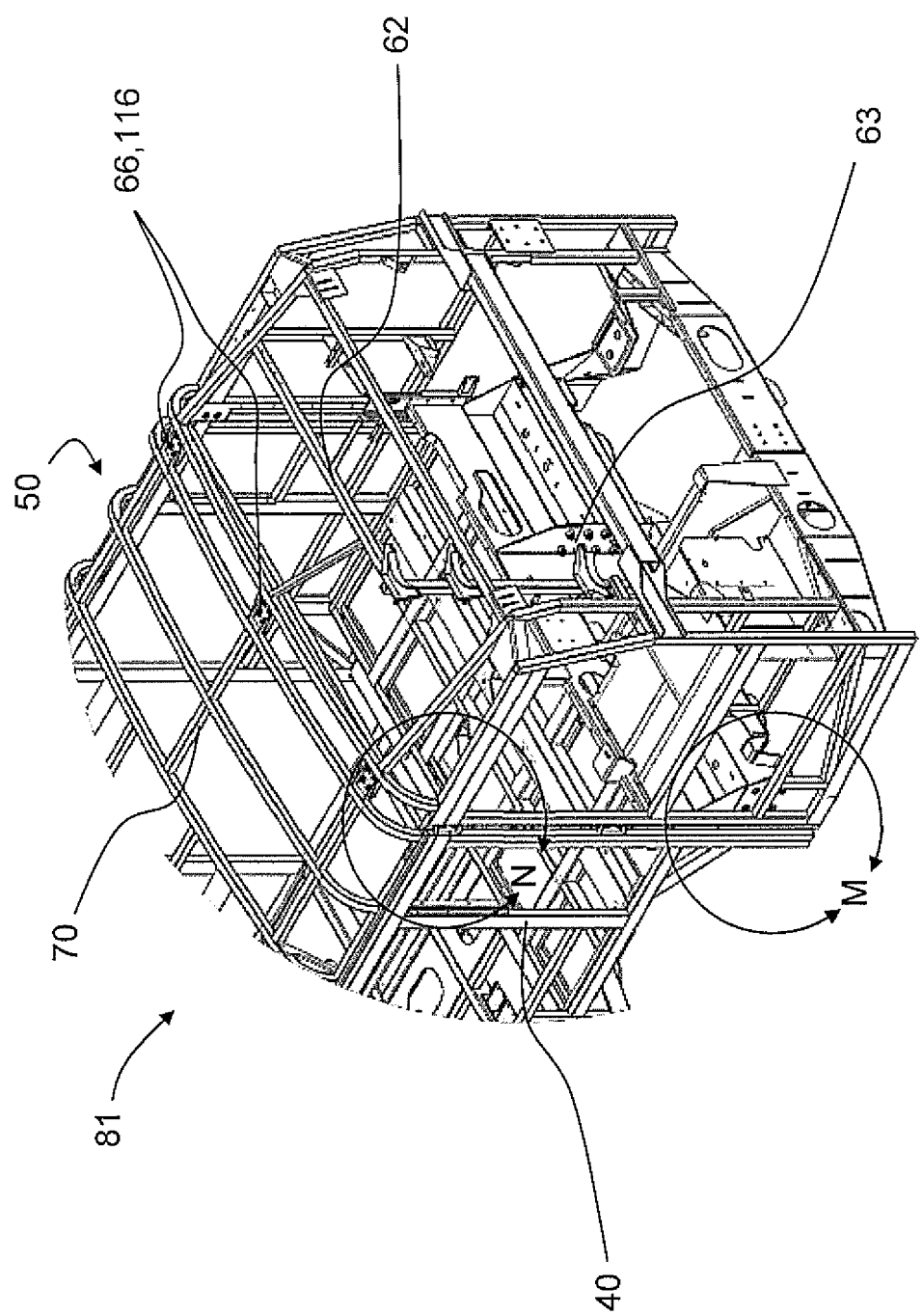
FIG. 20B is a rear orthographic view of the rear portion of the base vehicle fabricated structure and the power train module fabricated structure of FIG. 20A joined in an assembly, showing mechanically fastened joints between the base vehicle fabricated structure and the power train module fabricated structure.

Referring now to FIGS. 20A and 20B, there are shown rear orthographic views of a power train module fabricated structure 62 both detached from and in assembly with a rear portion of base vehicle fabricated structure 81, respectively, in accordance with the described embodiments. Arrayed around a trailing perimeter of base vehicle fabricated structure 81 are primary mounting locations 113 and 114, secondary mounting locations 115, and mounting receivers 116. Additionally, power train module fabricated structure 62 includes primary mounting plates 63 and 64, secondary mounting plates 65, and mounting flanges 66 arrayed around the leading perimeter of power train module fabricated structure 62.

Each of primary mounting locations 113 and 114, secondary mounting locations 115, and mounting receivers 116 of base vehicle fabricated structure 81 may generally be aligned, respectively, with primary mounting plates 63 and 64, secondary mounting plates 65, and mounting flanges 17, etc. (see, e.g. FIGS. 5A and 5B) of power train module fabricated structure 62 in order to establish mechanical joints in at least these locations. For example, mechanical fastening bolts 120 and mating nuts 121 are shown corresponding to primary mounting plate 63 and corresponding mounting location 113, as well as primary mounting plate 64 and corresponding primary mounting location 114. Mechanical fastening bolts 124 and mating nuts 125 are also shown corresponding to secondary mounting plates 65 and secondary mating locations 115. In some embodiments, mechanical fastening bolts 126 and mating nuts 127 can also be provided at corresponding mounting flanges 66 and mounting receivers 116.

Figure 21:
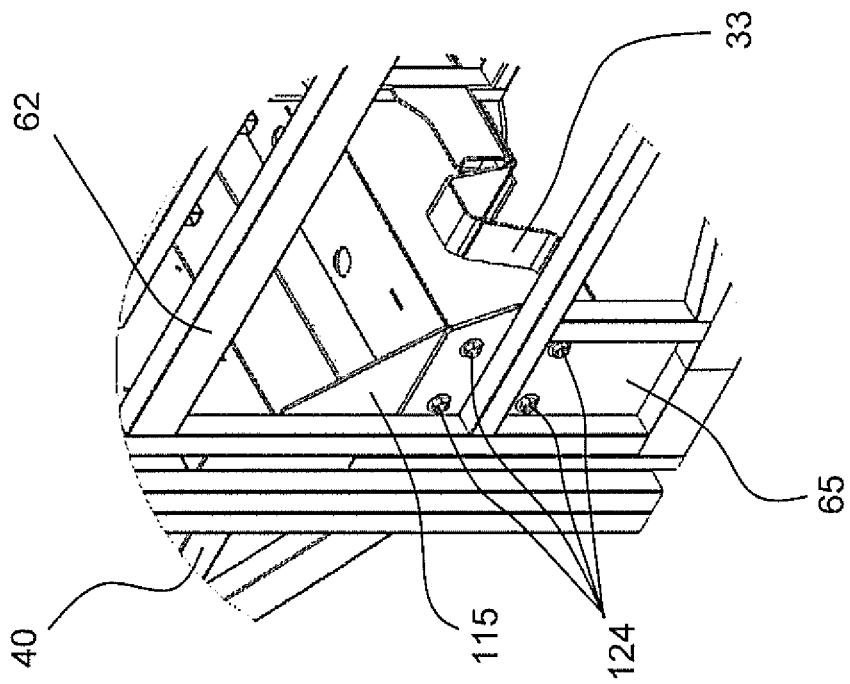
FIG. 21 is a close-up view of the mechanically fastened joint indicated in reference view M in FIG. 20B, illustrating the interrelated elements of several bolted connections.

Referring now to FIG. 21, there is shown a close-up of the example mechanical joint indicated by reference M in FIG. 20B in more detail. Rear module 33 includes a secondary mounting location 115 in proximity to left sidewall 40. Power train module fabricated assembly 62 with secondary mounting plate 65 is shown as installed to a base vehicle. A secondary bolted joint is formed by the clamping of secondary mounting plate 65 to secondary mounting location 115 with use of mechanical fastening bolts 124, for example.

Figure 22:
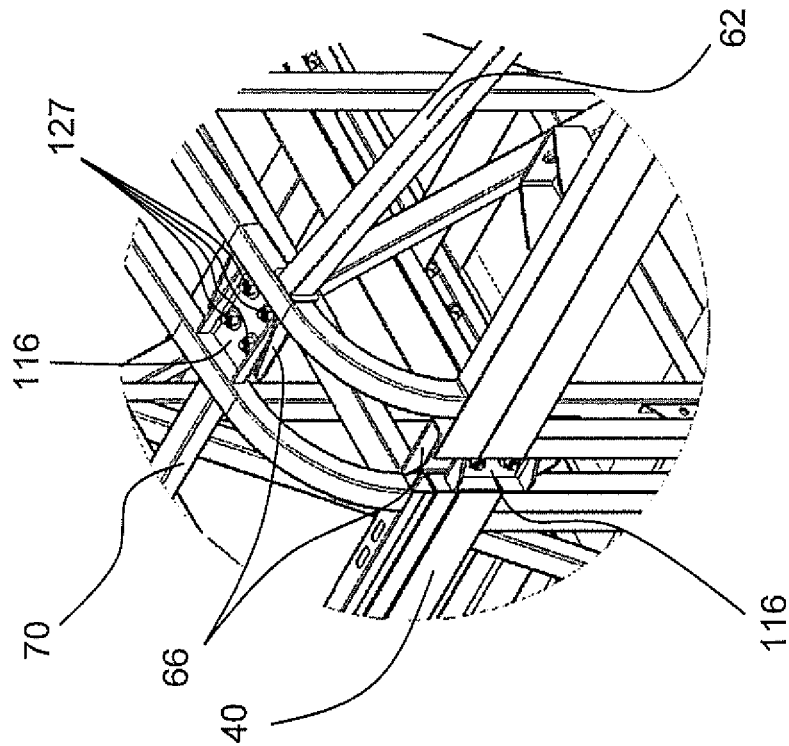
FIG. 22 is a close-up view of the mechanically fastened joint indicated in reference view N in FIG. 20B, illustrating the interrelated elements of several bolted connections.

Referring now to FIG. 22, there is shown a close-up of the example mechanical joint indicated by reference N in FIG. 20B in more detail. Left sidewall assembly 40 includes mounting receivers 116 in proximity to power train module fabricated structure 62, which itself includes corresponding mounting flanges 66. Bolted joints are formed by the clamping of the mounting receivers 116 to secondary mounting locations 66 by way of mating nuts 127, for example.

Figure 23:
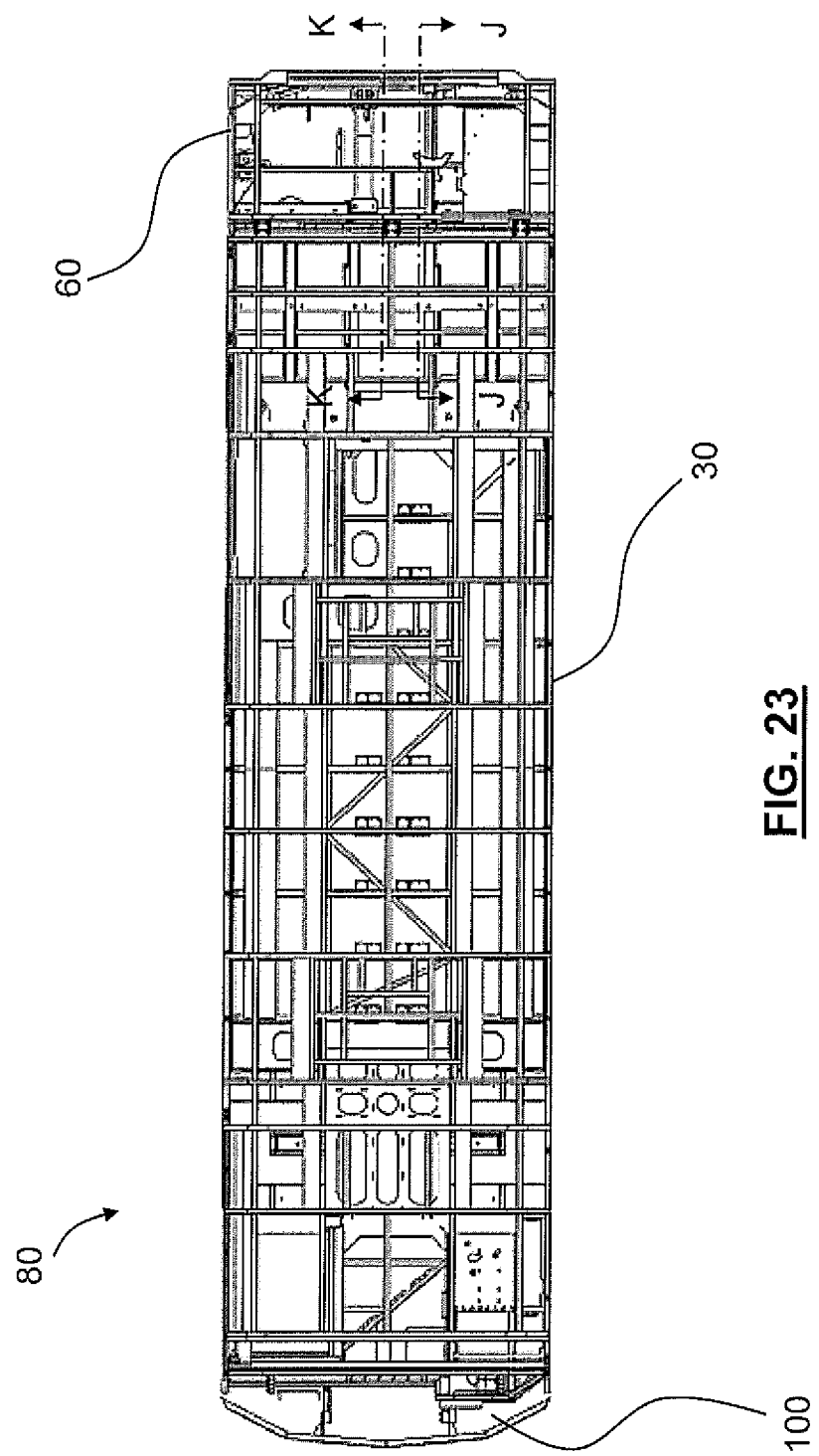
FIG. 23 is a top plan view of a fabricated vehicle assembly.

Referring now to FIG. 23, there is shown a top plan view of a complete vehicle fabricated assembly 80, including base chassis 30, power train module 60, and cab assembly 100. As described herein, mechanical joints and connections between these various modules and assemblies may be provided with use of mounting places and mechanical fasteners.

Figure 24:
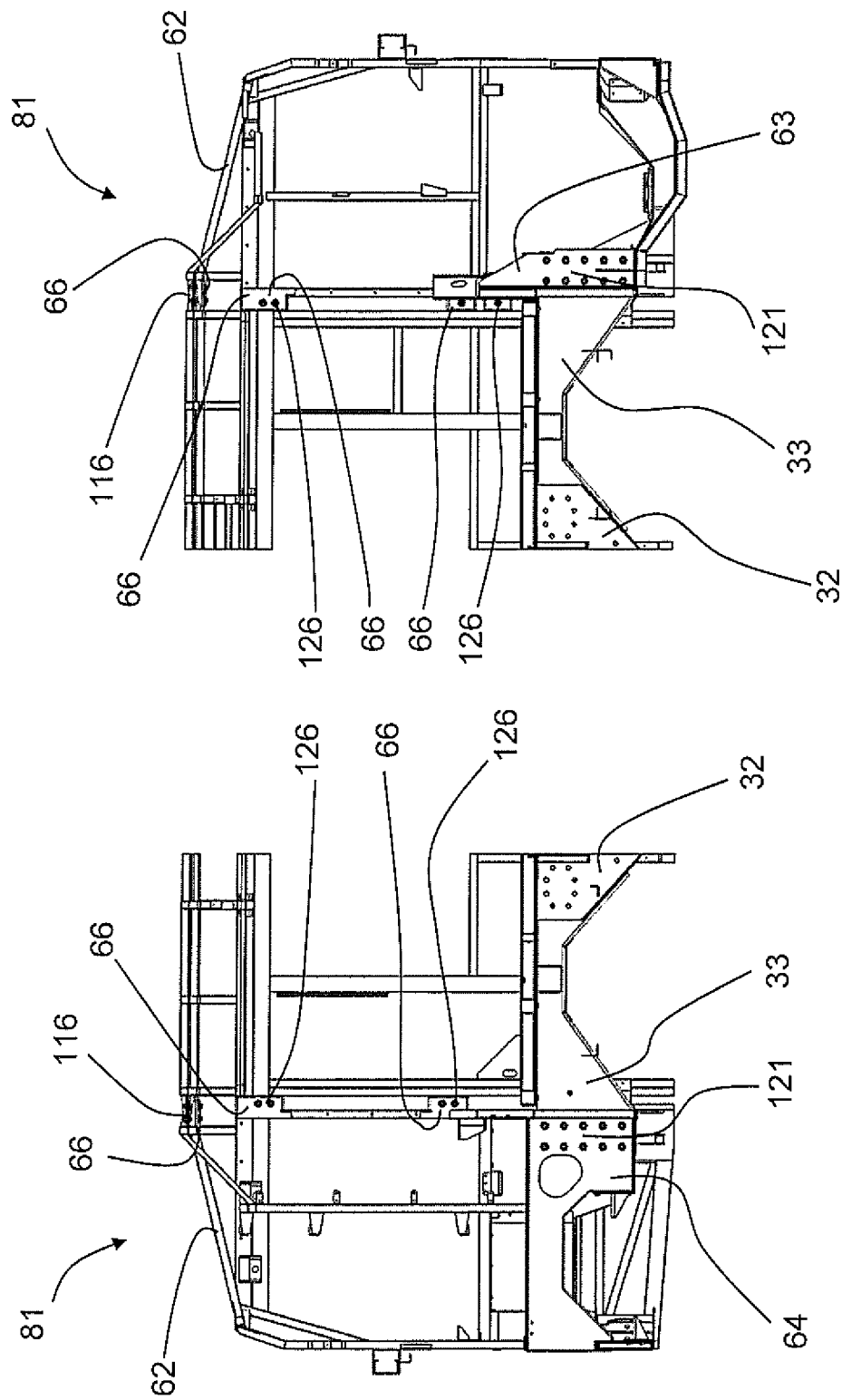
FIG. 24A is a right elevation view of the fabricated vehicle assembly shown in FIG. 23 along cross section J-J, showing a number of bolted connections.
FIG. 24B is a left elevation view of the fabricated vehicle assembly shown in FIG. 23 along cross section K-K, showing a number of bolted connections.

FIG. 24A is a right elevation view of the cross section view J-J indicated in FIG. 23. As shown, primary mounting plate 64 is inserted next to a corresponding plate in rear module 33 and is retained by mating nuts 121, thereby providing one side of a bolted structural connection between rear module 33 and midframe module 32 of base chassis 30. In addition, mounting flanges 66 can be arrayed around a mating perimeter of fabricated structure 62 and retained to corresponding mounting receivers 116 on base vehicle module 81 by mating nuts 126, for example.

FIG. 24B is a right elevation view of the cross section view K-K indicated in FIG. 23. Primary mounting plate 63 is shown inserted next to a corresponding plate in rear module 33 and is retained by mating nuts 121. Mounting flanges 66 again are arrayed around a mating perimeter of fabricated structure 62 and are retained to corresponding mounting receivers 116 on base vehicle module 81 by mating nuts 126, for example.

The example mechanically fastened joints illustrated in the drawings and described herein can be utilized advantageously for the attachment of the power train module 60 to the vehicle module 82. In particular, the described embodiments of these joints may allow for the installation and removal of the power train module 60 in an efficient and repeatable manner, while also allowing for the substitution or replacement of the power train module 60 with a module of alternative configuration.

Figure 25:
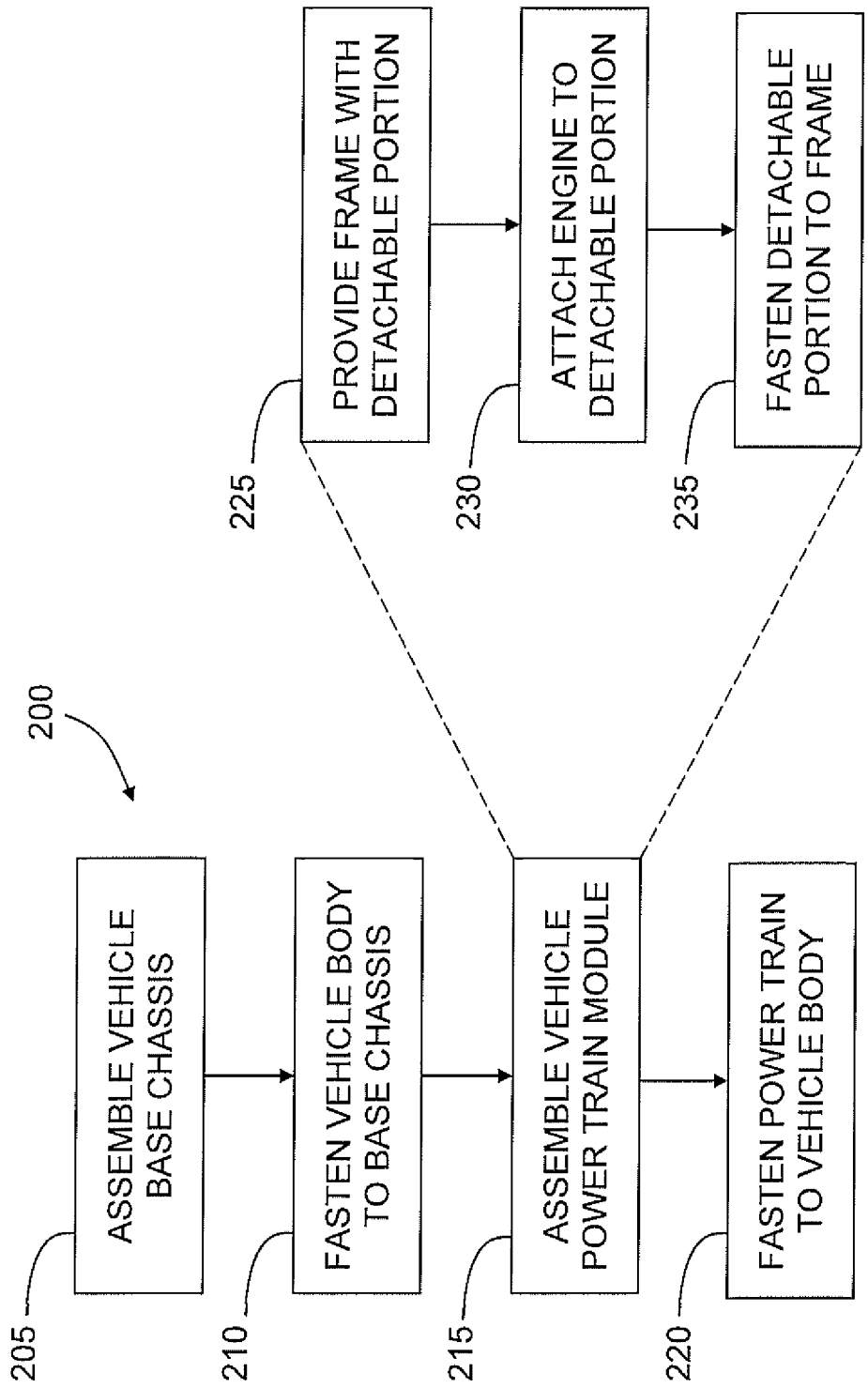
FIG. 25 is a flow chart illustrating a method of assembling a motor vehicle in accordance with the described embodiments.

Now referring to FIG. 25, there is shown a flow chart illustrating a method 200 of assembling a motor vehicle in accordance with the described embodiments. The motor vehicle may be any embodiment of vehicle 10 as described herein, details of which can be found above and may not be repeated here for clarity and convenience. Method 200 may generally be performed by any assembler of vehicle 10 as well as, in whole or in part, any person that is performing maintenance or other post-assembly work on a vehicle 10.

In some embodiments, method 200 may comprise assembling 205 a base chassis by joining together a plurality of fabricated base chassis subassemblies that may in some cases include at least three discrete base chassis subassemblies. For example, this might include a front module, a midframe module, and a rear module as described herein. For this purpose, one or more mechanically fastened interfaces may be utilized as described herein. Both permanent and/or non-permanent joints may be included in these interfaces in different possible configurations. The assembled base chassis may be supported on at least two axles and may provide the underlying support structure for a vehicle body.

Optionally, in some cases, method 200 may also involve selecting a type and configuration of the various subassemblies that are included in the base chassis. As described herein, different types and configurations of base chassis subassemblies may exist, each of which may be combined with one another in modular fashion in order to produce a final base chassis assembly. As examples only, this may include front, midframe, and rear modules of different lengths and/or profiles, as well as different passenger cab configurations including different door locations.

A vehicle body may be fastened 210 to the base chassis so as to form a vehicle module that provides structural rigidity for the motor vehicle. In some cases, the vehicle body may be assembled by joining together a plurality of fabricated vehicle body subassemblies, for example, which may include two or more sidewall subassemblies and a roof subassembly For this purpose, one or more mechanically fastened interfaces may be utilized as described herein. Both permanent and/or non-permanent joints may be included in these interfaces in different possible configurations.

Method 200 may also in some cases comprise assembling 215 a power train module of vehicle 10. Such power train module may be assembled independently of the vehicle module, either in the same location or assembly plant, but also potentially in different physical locations. As described herein, power train module may for example form the entire vehicle structure aft of the vehicle driven axle and may contain housing for a power train assembly that provides motive force for vehicle 10. Power train module may have any configuration as described herein.

Once assembled, power train module may be mechanically fastened 220 to the vehicle module by means of the one or more mechanical interfaces as described herein. For example, permanent and/or non-permanent joints may be utilized for this purpose in different possible configurations. Where non-permanent joints have been utilized, in some cases, method 200 may further include further include detaching the power train module from the vehicle module subsequent to being fastened together. In some cases, method 200 may additionally include the selection and installation of a fuel storage element to the vehicle module. Selection and/or installation may be made, for example, prior to fastening 220 the power train module to the vehicle module.

In some cases, assembling power train module may comprise providing 225 a frame or other support structure in which different components of power module 60 may be housed and supported. As described herein, such a support structure may include a portion that is separable or detachable from the rest of the structure. In some embodiments, the separable or detachable support element may include one or more differently configured mounts to which an engine may be attached 230. The detachable portion may then be fastened 235 to the rest of the support structure and installed on the power train module. As described herein, use of a separable or detachable portion of the support structure may allow for advantageous removal of the vehicle power train assembly without requiring removal of the entire power train module or support structure. This may, for example, facilitate service and repair of the power train module.

In some cases, optionally, the one or more mounts on the detachable or separable portion may accommodate different types of engine configurations and/or fuel storage elements. Thus, method 200 may also include selecting a type and/or configuration of power train module to be fastened to the vehicle module based on, for example, different engine types and fuel storage elements, such as gas engines, diesel engines, electric engines, and hybrid engines.

The above description is intended to provide a thorough description of various aspects and example embodiments of one or more inventions. Accordingly, description has been provided at different levels of abstraction. In some instances, embodiments may have been described on both a specific and a generic level, for example, where an aspect or component of the embodiment can be varied in a manner that is not inconsistent with the specific structure(s) and/or operation(s) set forth. In these instances, the specific embodiments set forth herein may not be the only ones contemplated and instead may only be exemplary of a more general or generic configuration. The scope of the invention(s) described herein is therefore defined solely by the language of the claims appended hereto, giving due consideration to applicable doctrines for construing their meaning.

The invention claimed is:

1. A passenger bus comprising:
   a base chassis supported on at least two axles, the base chassis comprising a plurality of fabricated base chassis subassemblies joined to one another by one or more mechanically fastened interfaces;
   a vehicle body mechanically fastened to the base chassis forming a vehicle module with a unitized frame to provide structural rigidity and a passenger area for the passenger bus; and
   a power train module comprising:
      a power train assembly comprising a motive power source for the vehicle, a transmission, and an electrical system;
      a power train module frame that supports the power train assembly; and
      a rear body assembly comprising a plurality of fabricated vehicle body subassemblies joined to one another and to the power train module frame by mechanically fastened interfaces;
   wherein the power train module frame comprises a plurality of longitudinal support members for attachment of the power train module to the unitized frame, the longitudinal support members configured to align the power train module with the unitized frame for attachment of the power train module to the unitized frame by means of mechanical fasteners to attach the power train to at least one driven axle of the bus.

2. The vehicle of claim 1, wherein the base chassis comprises at least three discrete base chassis subassemblies joined together.

3. The vehicle of claim 2, wherein the at least three discrete base chassis subassemblies comprise:
   a front subassembly comprising a mounting for a free axle;
   a rear subassembly comprising a mounting for a driven axle; and
   a middle subassembly supported between and coupling together the front and rear subassemblies.

4. The vehicle of claim 1, wherein the vehicle body comprises a plurality of fabricated vehicle body subassemblies joined to one another by one or more mechanically fastened interfaces.

5. The vehicle of claim 4, wherein the plurality of fabricated vehicle body subassemblies comprises:
   a plurality of sidewall subassemblies; and
   a roof subassembly supported on the plurality of sidewall subassemblies.

6. The vehicle of claim 1, wherein the vehicle module and the power train module are releasably fastened together so as to be separable therefrom following assembly.

7. The vehicle of claim 1, wherein the plurality of fabricated base chassis subassemblies are releasably fastened together by non-permanent joints.

8. The vehicle of claim 1, wherein the power train module forms the complete structure of the motor vehicle aft of the vehicle body.

9. The power train module of claim 1, wherein the vehicle motive power source comprises at least one of an internal combustion engine, and electric motor, and a hybrid power source.

10. The power train module of claim 1, comprising an internal combustion engine, an engine cooling system, and an engine exhaust treatment system.

11. A power train module for a rear-engine bus, the power train module comprising:
   a power train module frame that supports a power train comprising a vehicle motive power source and a transmission, an electrical system, and at least one battery; and
   a rear body assembly comprising a plurality of fabricated vehicle body subassemblies joined to one another and to the power train module frame by mechanically fastened interfaces;
   wherein the power train module frame comprises a mechanical interface for attachment of the power train module to, the mechanical interface comprising a plurality of longitudinal support members configured to align the power train module with a forward bus frame structure a plurality of attachment members for attachment of the power train module to the forward bus frame structure by means of mechanical fasteners to attach the power train to at least one driven axle of the bus.

12. The power train module of claim 11, wherein the power train module is detachable from the forward bus frame structure by removal of the mechanical fasteners.

13. The power train module of claim 12, wherein the power train module frame comprises an engine mount to which the vehicle motive power source is attachable.

14. The power train module of claim 11, wherein the mechanical interface comprises:
   at least one mounting plate supported on a crossbeam in a lower central area of the power train module frame; and
   a plurality of mounting flanges arrayed around a perimeter frame of the power train module frame.

15. The power train module of claim 11, wherein the power train module forms the complete structure of the bus aft of the forward bus frame structure.

16. The power train module of claim 11, wherein the vehicle motive power source comprises at least one of an internal combustion engine, and electric motor, and a hybrid power source.

17. The power train module of claim 11, comprising an internal combustion engine, an engine cooling system, and an engine exhaust treatment system.

* * * * *